United States Patent
Choi et al.

(10) Patent No.: US 10,310,553 B2
(45) Date of Patent: Jun. 4, 2019

(54) DISPLAY APPARATUS FOR VEHICLE AND VEHICLE

(71) Applicant: LG ELECTRONICS INC., Seoul (KR)

(72) Inventors: Changgeun Choi, Seoul (KR); Soono Song, Seoul (KR); Daehyun An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 15/348,052

(22) Filed: Nov. 10, 2016

(65) Prior Publication Data

US 2017/0192451 A1 Jul. 6, 2017

(30) Foreign Application Priority Data

Jan. 4, 2016 (KR) .......................... 10-2016-0000323

(51) Int. Cl.
| | |
|---|---|
| *G06F 1/16* | (2006.01) |
| *G06F 1/20* | (2006.01) |
| *G05D 23/19* | (2006.01) |
| *B60K 37/02* | (2006.01) |
| *B60K 35/00* | (2006.01) |
| *G06F 3/0484* | (2013.01) |
| *G06F 3/0488* | (2013.01) |

(52) U.S. Cl.
CPC ............ *G06F 1/1601* (2013.01); *B60K 35/00* (2013.01); *B60K 37/02* (2013.01); *G05D 23/1917* (2013.01); *G06F 1/206* (2013.01); *B60K 2350/2073* (2013.01); *B60K 2350/355* (2013.01); *G06F 3/0488* (2013.01); *G06F 3/04847* (2013.01)

(58) Field of Classification Search
CPC ...... G06F 1/1601; G06F 1/206; G06F 3/0488; G06F 3/04847; B60K 35/00; B60K 37/02; B60K 2350/2073; B60K 2350/355; G05D 23/1917
See application file for complete search history.

(56) References Cited

U.S. PATENT DOCUMENTS

| | | | | |
|---|---|---|---|---|
| 5,802,479 | A * | 9/1998 | Kithil ..................... | B60N 2/002 257/295 |
| 5,822,205 | A * | 10/1998 | Arihara .................. | G06F 9/451 700/86 |

(Continued)

FOREIGN PATENT DOCUMENTS

| | | |
|---|---|---|
| CN | 1300254 A | 6/2001 |
| CN | 1374632 A | 10/2002 |

(Continued)

*Primary Examiner* — Mohammad Ali
*Assistant Examiner* — Kelvin Booker
(74) *Attorney, Agent, or Firm* — Birch, Stewart, Kolasch & Birch, LLP

(57) ABSTRACT

A display apparatus for a vehicle and including a display; a heating element configured to provide heat to the display; an interface configured to receive at least one of interior temperature information and exterior temperature information about the vehicle; and a processor configured to control the heating element to produce heat based on the received at least one of the interior temperature information and the exterior temperature information about the vehicle.

14 Claims, 14 Drawing Sheets

(56) References Cited

U.S. PATENT DOCUMENTS

| | | | | |
|---|---|---|---|---|
| 5,825,283 A * | 10/1998 | Camhi | B60R 25/102 340/438 |
| 6,005,537 A * | 12/1999 | Yokota | G09G 3/18 345/33 |
| 6,009,355 A * | 12/1999 | Obradovich | B60G 17/0195 340/815.4 |
| 7,370,983 B2 | 5/2008 | DeWind | B60K 35/00 359/844 |
| 8,091,795 B1 * | 1/2012 | McLellan | G05D 23/1923 236/51 |
| 8,096,482 B2 * | 1/2012 | Dage | B60H 1/00657 123/179.2 |
| 8,194,133 B2 * | 6/2012 | DeWind | B60K 35/00 348/148 |
| 8,908,039 B2 * | 12/2014 | De Wind | B60K 35/00 348/148 |
| 9,775,100 B1 * | 9/2017 | Smereka | G01S 11/06 |
| 9,783,114 B2 * | 10/2017 | De Wind | B60K 35/00 |
| 2006/0164230 A1 * | 7/2006 | DeWind | B60K 35/00 340/461 |
| 2008/0266389 A1 * | 10/2008 | DeWind | B60K 35/00 348/115 |
| 2011/0244776 A1 * | 10/2011 | Jordan | B60H 1/00764 454/69 |
| 2012/0236152 A1 * | 9/2012 | De Wind | B60K 35/00 348/148 |
| 2013/0154298 A1 * | 6/2013 | Ricci | B60R 11/0229 296/37.12 |
| 2013/0211623 A1 * | 8/2013 | Thompson | G07C 5/008 701/2 |
| 2014/0229059 A1 * | 8/2014 | Surnilla | B60H 1/00742 701/36 |
| 2014/0306814 A1 * | 10/2014 | Ricci | H04W 4/21 340/425.5 |
| 2014/0309806 A1 * | 10/2014 | Ricci | B60Q 1/00 701/1 |
| 2014/0309813 A1 * | 10/2014 | Ricci | B60Q 1/00 701/2 |
| 2014/0309868 A1 * | 10/2014 | Ricci | G06K 9/00355 701/36 |
| 2014/0310031 A1 * | 10/2014 | Ricci | B60Q 1/00 705/5 |
| 2014/0310788 A1 * | 10/2014 | Ricci | B60Q 1/00 726/6 |
| 2015/0088339 A1 * | 3/2015 | Fisher | A61G 3/00 701/2 |
| 2015/0129192 A1 * | 5/2015 | Boss | B60H 1/00771 165/202 |
| 2015/0146000 A1 * | 5/2015 | De Wind | B60K 35/00 348/148 |
| 2015/0338694 A1 * | 11/2015 | Hamamoto | G02F 1/1337 349/61 |
| 2016/0070527 A1 * | 3/2016 | Ricci | G06F 3/165 715/716 |
| 2016/0086397 A1 * | 3/2016 | Phillips | G07C 5/0808 701/32.4 |
| 2016/0090105 A1 * | 3/2016 | Neubecker | B60W 40/02 701/23 |
| 2016/0167486 A1 * | 6/2016 | Yang | B60S 1/08 701/49 |
| 2016/0191584 A1 * | 6/2016 | Dickow | H04L 67/12 709/219 |
| 2016/0193895 A1 * | 7/2016 | Aich | B60H 1/00657 165/202 |
| 2016/0257198 A1 * | 9/2016 | Buttolo | B60K 35/00 |
| 2016/0269524 A1 * | 9/2016 | Stottlemyer | H04M 1/6091 |
| 2016/0280067 A1 * | 9/2016 | Cuddihy | B60N 2/00 |
| 2016/0280160 A1 * | 9/2016 | MacNeille | G05B 15/02 |
| 2016/0283361 A1 * | 9/2016 | Alexander | G06F 11/3688 |
| 2016/0305791 A1 * | 10/2016 | Neubecker | B60L 11/1861 |
| 2017/0001649 A1 * | 1/2017 | Dickow | H04W 12/08 |
| 2017/0013033 A1 * | 1/2017 | Dickow | H04L 65/4084 |
| 2017/0028850 A1 * | 2/2017 | Miller | B60K 35/00 |
| 2017/0028866 A1 * | 2/2017 | Miller | B60L 11/1861 |
| 2017/0104824 A1 * | 4/2017 | Bajwa | H04W 4/025 |
| 2017/0117628 A1 * | 4/2017 | Banasky | H01Q 1/3233 |
| 2017/0166165 A1 * | 6/2017 | Schindler | B60R 25/24 |
| 2017/0166166 A1 * | 6/2017 | Lindic | B60R 25/24 |
| 2017/0171272 A1 * | 6/2017 | Smereka | H04L 65/605 |
| 2017/0174157 A1 * | 6/2017 | Deljevic | B60L 1/003 |
| 2017/0174179 A1 * | 6/2017 | Schumacher | B60R 25/24 |
| 2017/0182975 A1 * | 6/2017 | Monig | B60R 25/24 |
| 2018/0029534 A1 * | 2/2018 | De Wind | B60K 35/00 |

FOREIGN PATENT DOCUMENTS

| | | |
|---|---|---|
| CN | 1839060 A | 9/2006 |
| CN | 101492025 A | 7/2009 |
| CN | 101881229 A | 11/2010 |
| CN | 102328592 A | 1/2012 |
| CN | 202250548 U | 5/2012 |
| CN | 102963235 A | 3/2013 |
| CN | 103718153 A | 4/2014 |
| DE | 10100672 A1 | 7/2002 |
| DE | 10353128 A1 | 6/2005 |
| JP | 2004-19590 A | 1/2004 |
| JP | 3593912 B2 | 11/2004 |
| KR | 10-2007-0093516 A | 9/2007 |
| KR | 10-2011-0045611 A | 5/2011 |
| KR | 10-2013-0071613 A | 7/2013 |
| KR | 10-2013-0080231 A | 7/2013 |
| KR | 10-2014-0105408 A | 9/2014 |
| KR | 10-2015-0111680 A | 10/2015 |
| SE | 0000187-5 L | 7/2001 |
| SE | 520585 C2 | 7/2003 |
| WO | WO 03/000513 A1 | 1/2003 |

* cited by examiner

DISPLAY APPARATUS FOR VEHICLE AND VEHICLE

CROSS-REFERENCE TO RELATED APPLICATION

This application claims the priority benefit of Korean Patent Application No. 10-2016-0000323, filed on Jan. 4, 2016 in the Korean Intellectual Property Office, the disclosure of which is incorporated herein by reference.

BACKGROUND OF THE INVENTION

1. Field of the Invention

The present invention relates to a display apparatus for vehicles and a vehicle including the same.

2. Description of the Related Art

A vehicle can be moved in a desired direction by a user riding therein. A typical example of the vehicle is an automobile. In addition, the vehicle may include a display providing various functions such as a cluster, navigation and an A/V device. The display apparatus may also be used as a human machine interface (HFI) for controlling driving-related operations of the vehicle.

In addition, the vehicle is usually parked in an outdoor environment and therefore the display apparatus is affected by the temperature of the exterior of the vehicle, namely the air temperature. For example, the display apparatus may become sluggish or fail to normally operate in the winter or in a low-temperature area, particularly when the temperature decreases below 0° C. The failure of operation of the display apparatus according to temperature may result in an accident.

SUMMARY OF THE INVENTION

Accordingly, one object of the present invention is to address the above-noted and other problems with the related art.

Another object is to provide a display apparatus for vehicles which normally operates even at low temperature.

To achieve these and other advantages and in accordance with the purpose of the present invention, as embodied and broadly described. Further, the present invention provides in one aspect a display apparatus in a vehicle and including a display; a heating element configured to provide heat to the display; an interface configured to receive at least one of interior temperature information and exterior temperature information about the vehicle; and a processor configured to control the heating element to produce heat based on the received at least one of the interior temperature information and the exterior temperature information about the vehicle. The present invention also provides a corresponding method of controlling a display apparatus in a vehicle.

Further scope of applicability of the present invention will become apparent from the detailed description. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
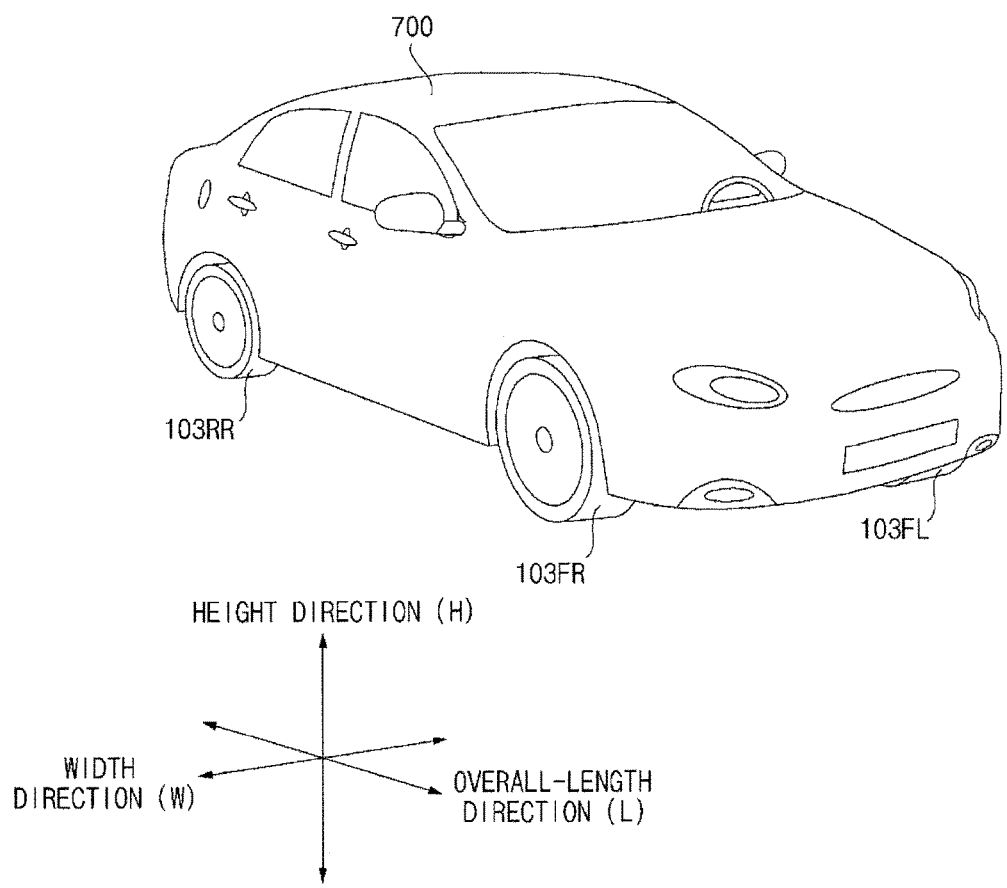
FIG. 1 is a view illustrating the exterior of a vehicle including a display apparatus for vehicles according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. As used Further, the suffixes "module" and "unit" are added or interchangeably used to facilitate preparation of this specification and are not intended to suggest unique meanings or functions.

In addition, the accompanying drawings are merely intended to facilitate understanding of the embodiments disclosed in this specification and not to restrict the technical spirit of the present invention. In addition, the accompanying drawings should be understood as covering all equivalents or substitutions within the scope of the present invention.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. Further, stating that one constituent is "directly connected" or "directly linked" to another should be understood as meaning that no other constituent is interposed between the constituents.

As used Further, the singular forms "a", "an", and "the" are intended to include the plural forms as well, unless context clearly indicates otherwise. In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The term "vehicle" used in this specification may include an automobile and a motorcycle. Hereinafter, description will be given mainly focusing on an automobile. Further, the vehicle according to embodiments of the present invention include a vehicle equipped with an internal combustion engine as a power source, a hybrid vehicle equipped with both an engine and an electric motor as a power source, and an electric vehicle equipped with an electric motor as a power source.

The vehicle according to embodiments of the present invention may be an autonomous vehicle. In the description, the left side of the vehicle refers to the left side with respect to the travel direction of the vehicle and the right side of the vehicle refers to the right side with respect to the travel direction of the vehicle. The term "front" refers to the forward driving direction of the vehicle, and the term "rear" refers to a reverse driving direction of the vehicle. Unless mentioned otherwise in the following description, the vehicle is assumed to be an LHD vehicle.

Figure 2:
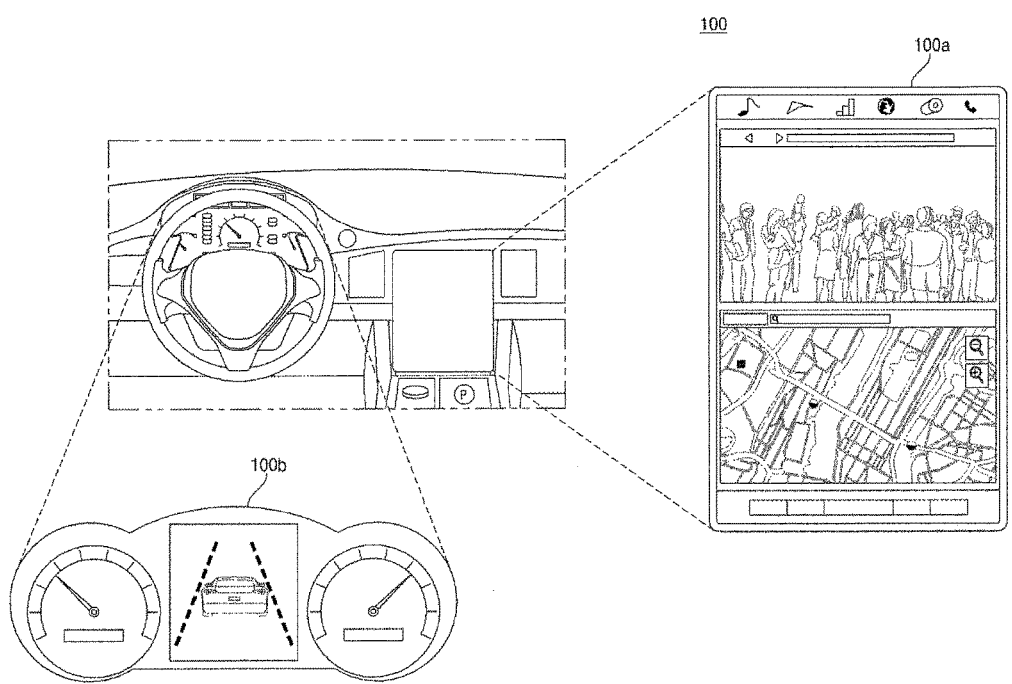
FIG. 2 is a view illustrating a display apparatus for vehicles according to an embodiment of the present invention.

FIG. 1 is a view illustrating the exterior of a vehicle provided with a display apparatus, and FIG. 2 is a view illustrating the display apparatus for vehicles according to an embodiment of the present invention.

Referring to FIGS. 1 and 2, a vehicle 700 includes wheels 103FR, 103FL, 103RL, . . . which are rotated by a power source and a steering input apparatus for adjusting the travel direction of the vehicle 700, and a display apparatus 100 provided in the vehicle 700.

In addition, the overall length refers to the length of the vehicle 700 from the front to back of the vehicle, the width refers to the width of the vehicle 700, and the height refers to the distance from the bottom of a wheel to the roof of the vehicle. In the description below, the overall-length direction L indicates a direction in which measurement of the overall length of the vehicle 700 is performed, the width direction W indicates a direction in which measurement of the width of the vehicle 700 is performed, and the height direction H indicates a direction in which measurement of the height of the vehicle 700 is performed.

Further, the display apparatus 100 may be positioned in one area of a cockpit module to allow a user to check a screen displayed on the display. For example, a display apparatus 100a may be disposed in one area of the center fascia and a display apparatus 100b may be disposed around the steering wheel. The display apparatus 100 may also include a transparent display or a head up display (HUD) to display content on the windshield.

Figure 3:
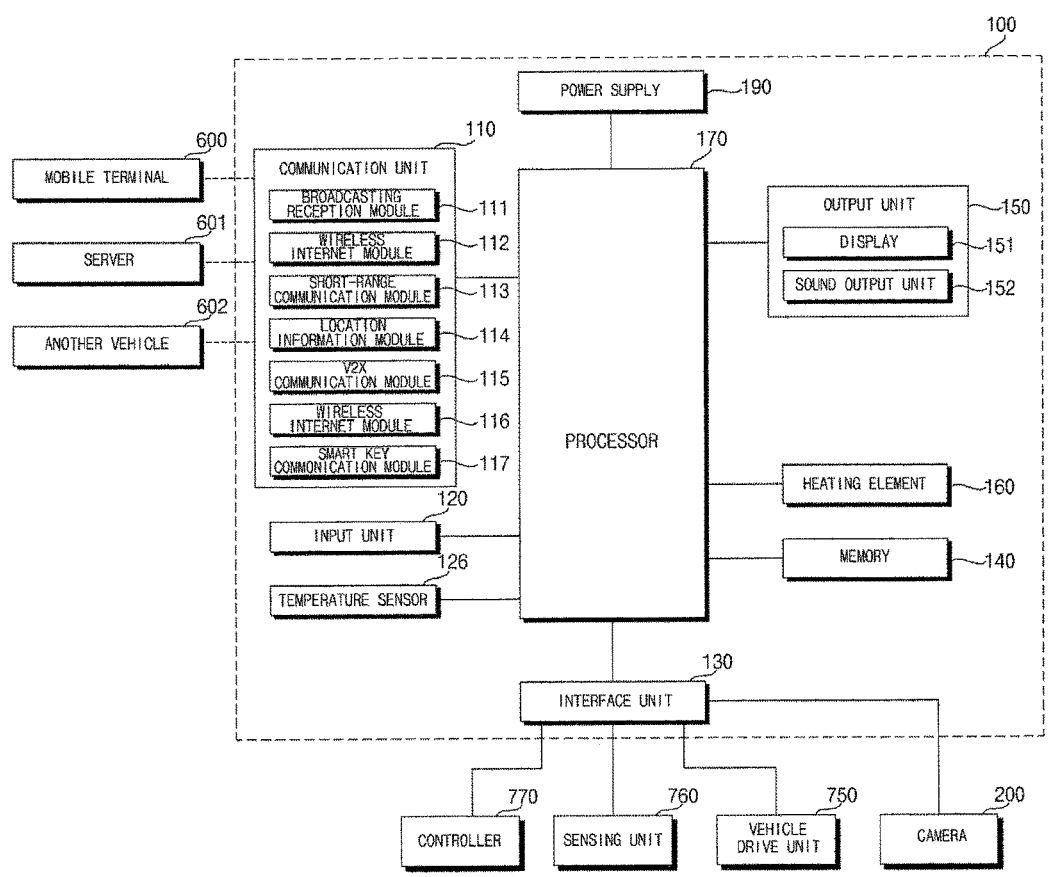
FIG. 3 is a block diagram illustrating a display apparatus for vehicles according to an embodiment of the present invention.

Next, FIG. 3 is a block diagram illustrating a display apparatus for vehicles according to an embodiment of the present invention. Referring to FIG. 3, the display apparatus 100 includes a communication unit 110, an input unit 120, a temperature sensor 126, an interface unit 130, a memory 140, an output unit 150, a heating element 160, a processor 170, and a power supply 190.

The communication unit 110 may include at least one module enabling wireless communication between the display apparatus 100 and a mobile terminal 600, between the display apparatus 100 and an external server 601 or between the display apparatus 100 and another vehicle 602. The communication unit 110 may also include at least one module for connecting the display apparatus 100 to at least one network.

Further, the communication unit 110 includes a broadcast reception module 111, a mobile communication module 112, a short-range communication module 113, a location information module 114, a V2X communication module 115, a wireless Internet module 116, and a smart key communication module 117. The broadcast reception module 111 receives a broadcast signal or broadcast-related information from an external broadcast management server over a broadcast channel. Further, the broadcast includes radio broadcast or TV broadcast.

In addition the mobile communication module 112 transmits and receives a radio signal to and from at least one of a base station, an external terminal and a server over a mobile communication network which is built according to the connected standards for mobile communication or communication schemes (e.g., GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

The radio signal may contain various kinds of data according to transmission and reception of a voice call signal, a video call signal, or a text/multimedia message. In addition, the short-range communication module 113, which is used for short-range communication, supports short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 113 can establish a wireless local area network to implement short-range communication between the vehicle 700 and at least one external device. In particular, the short-range communication module 113 can wirelessly exchange data with the mobile terminal 600, and receive weather information and traffic situation information (e.g., TPEG (Transport Protocol Expert Group)) from the mobile terminal 600. For example, once a user enters the vehicle 700, the mobile terminal 600 of the user can be paired with the vehicle 700 automatically or by execution of an application by the user.

An example of the location information module 114, which serves to acquire the location of the vehicle 700, is a global positioning system (GPS) module. For example, if the vehicle utilizes the GPS module, the location of the vehicle can be acquired using a signal from a GPS satellite.

In addition, the V2X communication module 115 serves to perform wireless communication with the server 601 or another vehicle 602. In more detail, the V2X communication module 115 includes a module capable of implementing a vehicle-to-vehicle communication (V2V) protocol or a vehicle-to-infrastructure communication (V2I) protocol. Further, the vehicle 700 can perform wireless communication with the external server 601 or the vehicle 602 through the V2X communication module 115.

The wireless Internet module 116, which refers to a module for wireless Internet access, may be installed inside or outside the vehicle 700. The wireless Internet module 116 is also configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 116 transmits and receives data according to at least one of the aforementioned wireless Internet technologies. For example, the wireless Internet module 116 can wirelessly exchange data with the external server 601 and receive weather information and traffic situation information (e.g., TPEG (Transport Protocol Expert Group)) from the external server 601.

In addition; the smart key communication module 117 can perform wireless communication with a smart key carried by the user using low-frequency (LF) communication. In addition, the smart key communication module 117 can sense a distance between the vehicle 700 and the user based on the strength of a signal received from the smart key such as based on a Received Signal Strength Indication (RSSI).

Further, the input unit 120 may include a user input unit and a sound input unit. In more detail, the user input unit serves to receive information from the user and when information is input through the user input unit, the processor 170 can control operation of the display apparatus 100 to correspond to the input information. The user input unit may include a touch input or a mechanical input.

In addition, the sound input unit can process an external sound signal to create and use electrical data for various purposes according to functions being executed by the display apparatus 100. For example, the sound input unit can convert a voice command from the user into electrical data and then deliver the electrical data to the processor 170.

Further, the temperature sensor 126 can sense temperature by employing one of thermal expansion, thermal electromotive force, electric resistance, a semiconductor, a magnetic element, elasticity, radiation, and a photoelectric effect. For example, the temperature sensor 126 may include an NTC thermistor, and sense the temperature using the property of the thermistor whose resistance varies with temperature.

The temperature sensor 126 can also sense the temperature of the interior of the vehicle 700. For example, the temperature sensor 126 can sense the temperature of the surroundings of the display 151 or the temperature of the interior of the vehicle 700 and also sense the temperature of a liquid crystal panel 311 (see FIG. 7).

In addition, the interface unit 130 can receive data, information and signals, or transmit data, information and signals processed or generated by the processor 170. Thus, the interface unit 130 can perform data communication with a controller 770, a sensing unit 760, a vehicle drive unit 750, a camera 200, and the like, which are included in the vehicle, through wired or wireless communication. The interface unit 130 can also receive sensor information from the controller 770 or the sensing unit 760.

Further, the sensor information includes vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle exterior temperature information, vehicle interior humidity information and/or vehicle exterior illumination information, for example.

In addition, the sensing unit 760 senses a signal related to traveling of the vehicle 700. The sensor information can be received from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, a vehicle exterior temperature sensor, a vehicle interior humidity sensor, an illumination sensor, and the like. The position module may also include a GPS module for receiving GPS information.

Of the sensor information, vehicle direction information, vehicle location information, vehicle orientation information, vehicle speed information and vehicle inclination information which are related to travel of the vehicle is referred to as vehicle travel information. The interface unit 130 can also receive object information from the camera 200.

In addition, the camera 200 can detect lane detection (LD), vehicle detection (VD), pedestrian detection (PD), bright-spot detection (BD), traffic sign recognition (TSR), and road surface detection, and the like based on an acquired image. The camera 200 can also generate information about the distance to a detected object. The interface unit 130 can receive surroundings-of-vehicle information from a communication unit 710 (see FIG. 5), the sensing unit 760 or the camera 200.

The surroundings-of-vehicle information includes object information, weather information, driving road information, travel time information, illumination information and the like. Further, the object information includes information indicating presence or absence of an object, location information about the object, information about distance to the object and relative speed information about the object, for example.

In addition, the interface unit 130 can receive remote engine start event information. When the vehicle 700 receives a remote engine start signal from the smart key carried by the user, the controller 770 of the vehicle 700 can start the engine of the vehicle 700. In this instance, the interface unit 130 can receive engine on information from the controller 770.

Further, the interface unit 130 can receive user approach event information. Also, the object sensor 761 or the camera 200 of the vehicle 700 can sense an approach of the user. The interface unit 130 can also receive user approach event information from the object sensor 761 or the camera 200.

In addition, the interface unit 130 can receive information about the distance to the user or approach speed information of the user. The object sensor 761 or the camera 200 of the vehicle 700 can calculate the distance to the user and the approach speed of the user. Further, the interface unit 130 can receive the information about the distance to the user or the user approach speed information from the object sensor 761 or the camera 200. The interface unit 130 can also receive door opening event information and the processor 170 can receive the door opening event information from the controller 770.

In addition, the memory 140 is electrically connected to the processor 170 and can store basic data for each unit, control data for controlling operation of each unit, and input/output data. The memory 140 may correspond to various storage devices such as a ROM, RAM, EPROM, flash drive, and hard drive in terms of hardware. The memory 140 can also store various kinds of data for overall operation of the display apparatus 100 including a program for processing or controlling the processor 170.

The memory 140 may also store map data for implementing the navigation function. Further, the map data can be stored as a default when the vehicle is shipped. Alternatively, the map data can be received from an external device through the communication unit 110 or the interface unit 130. According to an embodiment, the memory 140 may be integrated with the processor 170.

In addition, as shown in FIG. 3, the output unit 150, which serves to output information processed by the processor 170, includes a display unit 151 and a sound output unit 152. The display 151 displays information processed by the processor 170. For example, the display 151 may display vehicle-related information.

Further, the vehicle-related information includes vehicle control information for direct control of the vehicle or vehicle driving assistance information for assisting the driver in driving the vehicle. The vehicle-related information may also include vehicle condition information indicating the current condition of the vehicle or vehicle driving information related to driving of the vehicle.

The display 151 may include at least one of a liquid crystal display (LCD), a thin film transistor-liquid crystal display (TFT LCD), an organic light-emitting diode (OLED) display, a flexible display, a 3D display and an e-ink display. The display 151 may form a layered structure together with a touch sensor or be integrated with the touch sensor, thereby implementing a touchscreen.

The touchscreen functions as a user input unit providing an input interface between the display apparatus 100 and the user and an output interface between the display apparatus 100 and the user. In this instance, the display 151 may include a touch sensor for sensing a touch applied to the display 151 in order to receive a control command in a touch manner. Thus, the display 151 can receive a touch input.

When the display 151 is touched, the touch sensor can sense the touch, and the processor 170 can generate a control command corresponding to the touch. Content input through touch may include characters, numbers, or menu items which can be indicated or specified in various modes.

Further, the display 151 may be implemented to display a screen is in one area of the windshield and may include a transparent display. In this instance, the transparent display may be attached to the windshield and output information. The transparent display may also have predetermined transparency and display a predetermined screen image.

To have transparency, the transparent display may include at least one of a transparent thin film electroluminescent (TFEL) display, a transparent organic light-emitting diode (OLED), a transparent liquid crystal display (LCD), a light-transmittable transparent display and a transparent light emitting diode display (LED). The transparency of the transparent display can also be adjusted according to control of the processor 170.

Further, the display 151 may include a projection module and output information through an image projected onto the windshield. In more detail, the projection module protects a beam toward the windshield or a screen provided in the vehicle using a light source and a projection lens. The projection module can also implement an image corresponding to the information processed by the processor 170. That is, the projection module can implement an image using light generated from the light source, and project the implemented image onto the windshield. In this instance, LEDs, lasers, or the like are preferably used as the light source.

In addition, the sound output unit 152 converts an electrical signal from the processor 170 into an audio signal and outputs the audio signal. The sound output unit 152 may also be provided with a speaker and output sound corresponding to operation of the user input unit.

Further, the heating element 160 provides heat to the display 151 and may be formed in the shape of a film. In this instance, the heating element 160 may be referred to as a heating film. The heating element 160 will be described with reference to FIGS. 6 and 7 later.

The processor 170 is electrically connected to the respective units in the display apparatus 100. Thereby, the processor 170 controls overall operation of the respective units. The processor 170 also controls the output unit 150 to output the information or data received through the communication unit 110, the input unit 120 or the interface unit 130. In addition, the processor 170 controls the output unit 150 to output information or data stored in the memory 140. The processor 170 can directly output received information or data or process and output the information or data and output the information or data through the display 151. The processor 170 can also audibly output the information or data through the sound output unit 152.

Further, the processor 170 can generate new information based on the information or data received through the interface unit 130 and control the display 151 to display the generated information or a screen image corresponding to the generated information. The processor 170 can also acquire interior temperature information or exterior temperature information about the vehicle 700. Thus, the processor 170 can control the heating element 160 to produce heat based on the interior temperature information or the exterior temperature information. In this instance, the heating element 160 can provide heat to the display to allow the display 151 to normally operate even in a low-temperature environment.

In addition, the processor 170 can control the heating element 160 to produce heat based on the temperature of the surroundings of the display 151 sensed by the temperature sensor 126. For example, the processor 170 can control the heating element 160 to produce heat based on the temperature information about the liquid crystal panel 311 (see FIG. 7) sensed by the temperature sensor 126.

According to an embodiment of the present invention, the exterior temperature information may be provided to the external server 601 through the communication unit 110. For example, the processor 170 can receive temperature information corresponding to the location of the vehicle 700 from the weather information providing server 601, based on the location information about the vehicle 700 acquired through the location information module 114.

The processor 170 can also receive event information through the interface unit 130. Further, the image information may be event information for controlling the heating element 160. Upon receiving the event information, the processor 170 can control the heating element 160 to produce heat. The event information may also be received through the communication unit 110, and received from the camera 200 or the sensing unit 760 of the vehicle 700.

Further, the processor 170 can receive remote engine start event information through the interface unit 130. When the vehicle 700 receives a remote engine start signal from a smart key carried by the user, the controller 770 of the vehicle 700 may start the engine of the vehicle 700. In this instance, the processor 170 can receive engine on information from the controller 770 through the interface unit 130.

Alternatively, the processor 170 can receive remote engine start event information through the communication unit 170. For example, the processor 170 can receive start event information through the smart key communication module 117. The processor 170 can control the heating element 160 to produce heat according to the remote engine start event information.

As the heating element 160 is controlled to produce heat according to the remote engine start event information as described above, the display 151 can normally operate in a cold environment before the user enters the vehicle 700. The processor 170 can acquire user approach event information through the interface unit 130. For example, the processor 170 can receive user information from the sensing unit 760 or the camera 200 through the interface unit 130.

Further, the user information may include information about the distance to the user, and approach speed information about the user. If the distance to the user is within a predetermined distance, the processor can determine that the user approaches and acquire the user approach event information. Alternatively, the processor 170 can receive user approach event information through the communication unit 170. For example, the processor 170 can receive the user approach event information through the smart key communication module 117.

In addition, the processor 170 can control the heating element 160 to produce heat according to the user approach event information. By controlling production of heat in the heating element by sensing approach of the user as described above, the display 151 can normally operate in a cold environment before the user enters the vehicle 700.

The processor 170 can also control the degree of heating of the heating element 160 according to the approach speed of the user. Further, the degree of heating includes a heating rate or the amount of produced heat. For example, the processor 170 can control the heating rate or the amount of produced heat of the heating element 160 to increase in proportion to the approach speed of the user.

In addition, user approach speed information can be received through the interface unit 130 or acquired through the communication unit 110. By controlling the degree of heating of the heating element according to the approach speed of the user, the display can normally operate even when the user rapidly approaches the vehicle.

Further, the processor 170 can receive door opening event information about the vehicle 700 through the interface unit 130 and control the heating element to produce heat according to the door opening event information. Upon receiving the door opening event, the processor 170 can control the heating element 160 to produce maximum heat. For example, when the door opening event is received, the processor 170 can control the heating element 160 to produce heat at a maximum rate such as at a maximum heating rate.

In addition, upon receiving the door opening event information, the processor 170 can provide an air conditioner included in the vehicle 700 with a control signal for supplying warm air to the display 151. In more detail, the processor 170 can provide the control signal to the air conditioning drive unit 755 of the vehicle 700 and the air conditioning drive unit 755 of the vehicle 700 can control the air conditioner to supply warm air to the display 151. In this instance, it is preferable to provide warm air with a maximum power at a maximum temperature.

By controlling the heating element 160 to produce maximum heat according to the event of the user opening the door and controlling warm air to be provided to the display 151 as described above, the temperature of the display 151 can be increased to a temperature allowing normal operation of the display 151 in a short time.

In addition, the processor 170 can receive a reservation time input through a touch input to the display 151, for example and can control the heating element 160 to produce heat at the reservation time. The processor 170 can receive a heating duration input through touch input to the display 151, for example and control the heating element 160 to produce heat for the heating duration. After the heating duration passes, the processor 170 can control the heating element 160 to stop producing heat.

When the heating element 160 produces heat according to a reservation time, the processor 170 can control the heating element 160 to stop producing heat if the vehicle 700 fails to start even after a preset time passes. By controlling production of heat in the heating element 160, the heating duration and the operation of stopping production of heat from the heating element 160 according to the user input as described above, the display 151 can properly operate as desired by the user.

In addition, the processor 170 can receive information about the temperature of the surroundings of the display 151 from the temperature sensor 126 and control the heating element 160 to maintain the temperature of the surroundings of the display 151 within a predetermined range. For example, the processor 170 can control the heating element 160 to maintain the temperature of the liquid crystal panel 311 (see FIG. 7) within a predetermined range. Further, the predetermined range may be a temperature range allowing the display 151 to operate normally.

When the temperature of the surroundings of the display 151 reaches a predetermined temperature value, the processor 170 can control the heating element 160 to stop producing heat. By controlling the heating element 160 according to the temperature of the surroundings of the display in this manner, an optimum temperature for operation of the display 151 is provided to allow the display 151 to operate normally.

When the interior temperature or the exterior temperature is below 0° C., the processor 170 can control the degree of heating of the heating element 160 in proportion to the absolute value of the interior temperature of the vehicle 700 or the exterior temperature of the vehicle 700. Further, the degree of heating includes a heating rate or the amount of produced heat. For example, the processor 170 can control the rate of heating or the amount of produced heat of the heating element 160 to increase in proportion to the absolute value.

In addition, the processor 170 can acquire location information about the vehicle 700 through the location information module 114 and can control the degree of heating of the heating element 160 based on the location information. Further, the degree of heating includes a heating rate or the amount of produced heat. For example, the processor 170 can receive temperature information corresponding to the location of the vehicle 700 from the weather information providing server 601, based on the location information about the vehicle 700 acquired through the location information module 114 and control the degree of heating of the heating element 160 based on the temperature information.

If the heating element 160 is not controllable, the processor 170 can provide a control signal for supplying warm air to the display 151 to an air conditioner included in the vehicle 700. For example, the heating element 160 may be uncontrollable due to failure of the heating element 160. In this instance, the processor 170 can provide a control signal to the air conditioning drive unit 755, and air conditioning drive unit 755 can control the air conditioner according to the control signal. The air conditioner can then provide warm air into the vehicle to supply warm air to the display 151.

Thereby, even if the heating element 160 fails, the display 150 can normally operate as warm air is provided to the display 151 by controlling the air conditioner. The processor 170 can also provide interior temperature information or exterior temperature information about the vehicle 700 to an external device through the communication unit 110. Further, the external device may be a mobile terminal 600 carried by the user.

By providing the interior temperature information or the exterior temperature information about the vehicle 700 to the user in this way, the user can directly control the heating element 160 to produce heat, through the mobile terminal 600. The processor 170 can receive a control signal for controlling the heating element 160 to produce heat from an external device such as the mobile terminal 600 through the communication unit 110. The processor 170 can then control the heating element 160 according to the received control signal.

The processor 170 can also provide information indicating whether the heating element 160 produces heat to an external device such as the mobile terminal 600 through the communication unit 110. In addition, the processor 470 may be implemented using at least one of application specific integrated circuits (ASICs), digital signal processors (DSPs), digital signal processing devices (DSPDs); programmable logic devices (PLDs), field programmable gate arrays (FPGAs), processors, controllers, micro-controllers, microprocessors, and electric units for performing other functions. The power supply 190 can be controlled by the processor 170 to supply electric power for operation of respective constituents. In particular, the power supply 190 can receive power from, for example, a battery in the vehicle.

Figure 4:
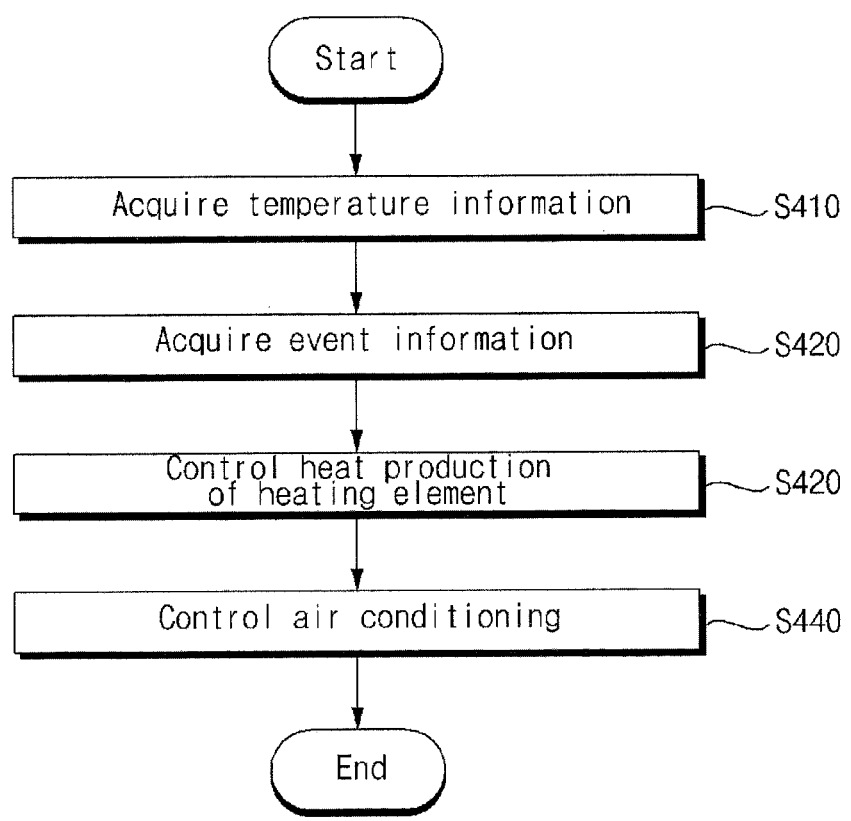
FIG. 4 is a flowchart illustrating operation of a display apparatus for vehicles according to an embodiment of the present invention.

Next, FIG. 4 is a flowchart illustrating operation of a display apparatus for vehicles according to an embodiment of the present invention. Referring to FIG. 4, the processor 170 acquires temperature information (S410). Further, the temperature information may include an interior temperature of the vehicle 700 or an exterior temperature of the vehicle 700.

For example, the processor 170 can receive information about the interior temperature or exterior temperature of the vehicle 700 from the sensing unit 760 through the interface unit 130, receive information about the interior temperature of the vehicle 700 through the temperature sensor 126, and receive temperature information corresponding to the location information about the vehicle 700 from the weather information providing server 601 through the communication unit 110.

In addition, the processor 170 acquires event information (S420), which may be trigger data for controlling the heating element 160 to produce heat. For example, the processor 170 can acquire remote engine start event information, user approach event information and door opening event information.

Further, the processor 170 controls the heating element to produce heat based on the temperature information or the event information (S430). For example, the processor 170 can control the heating element 160 to produce heat based on the interior temperature information or the exterior temperature information. For example, when the processor 170 receives event information, the processor 170 can control the heating element 160 to produce heat.

In addition, the processor 170 can provide a control signal to the air conditioning drive unit 755 configured to drive the air conditioner in order to provide warm air to the display 151 (S440). Step S440 is selectively operable according to an embodiment of the present invention. For example, upon receiving the door open event information, the processor 170 can provide the air conditioner included in the vehicle 700 with a control signal for supplying warm air to the display 151.

Further, the processor 170 can provide the control signal to the air conditioning drive unit 755 of the vehicle 700 to control the air conditioner to supply warm air to the display 151. In this instance, it is preferable to provide warm air with maximum power at maximum temperature.

By controlling the heating element 160 to produce maximum heat according to the event of the user opening the door and warm air to be supplied to the display 151 as described above, the temperature of the display 151 can be increased to a temperature allowing normal operation of the display 151 in a short time. If the heating element 160 is not controllable, the processor 170 can provide a control signal for supplying warm air to the display 151 to an air conditioner included in the vehicle 700.

For example, as discussed above, the heating element 160 may be uncontrollable due to failure of the heating element 160. In this instance, the processor 170 can provide a control signal to the air conditioning drive unit 755 to control the air conditioner according to the control signal. The air conditioner can also provide warm air into the vehicle to supply warm air to the display 151. Thereby, even if the heating element 160 fails, the display 150 can normally operate as warm air is provided to the display 151 by controlling the air conditioner.

Figure 5:
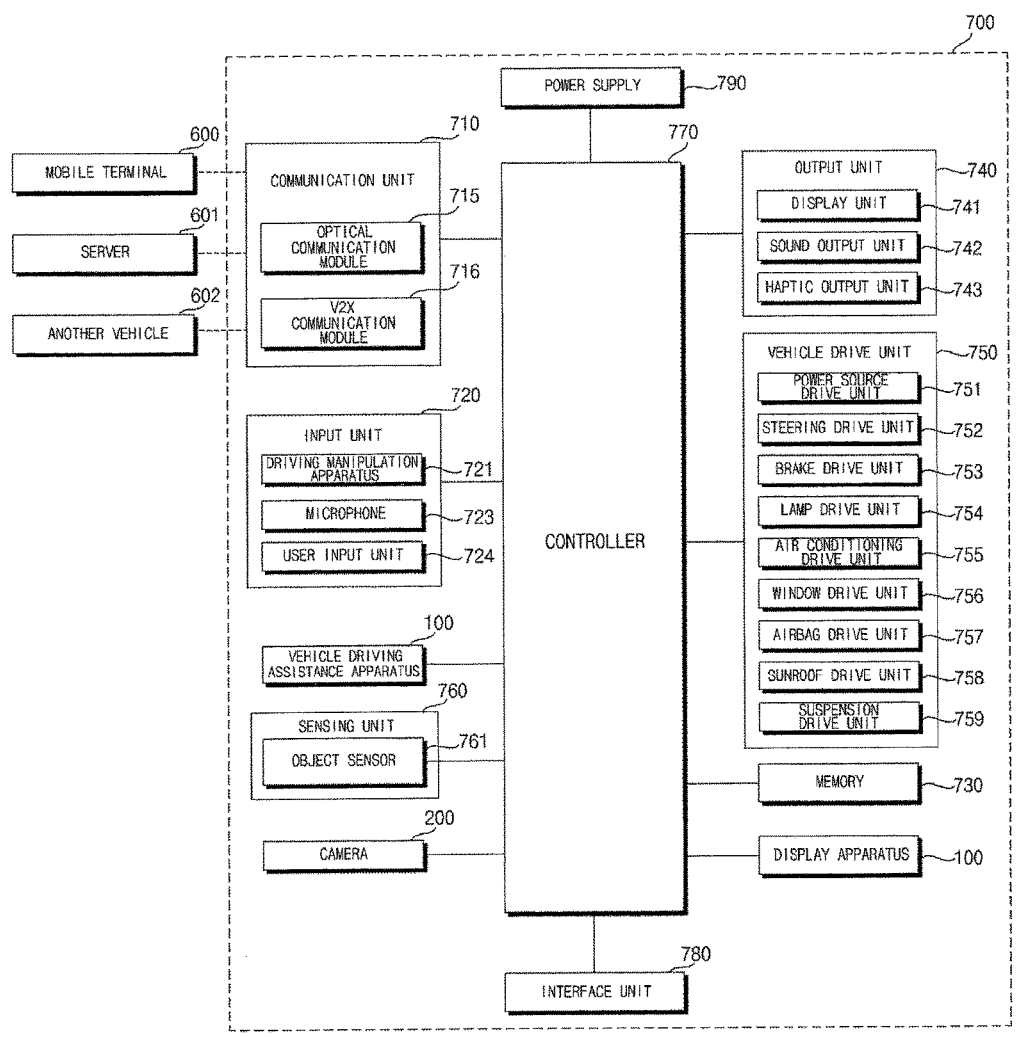
FIG. 5 is a block diagram illustrating a vehicle according to an embodiment of the present invention.

Next, FIG. 5 is a block diagram illustrating a vehicle according to an embodiment of the present invention. Referring to FIG. 5, the vehicle 700 includes a communication unit 710, an input unit 720, a sensing unit 760, an output unit 740, a vehicle drive unit 750, a memory 730, an interface unit 780, a controller 770, a power supply 790, a camera 200 and a display apparatus 100 for the vehicle.

The communication unit 710 includes at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

Further, the communication unit 710 may include an optical communication module 715 and a V2X communication module 716. The optical communication module 715 may include a light transmitter and a light receiver. In more detail, the light receiver can covert a light signal into an electrical signal to receive information, and the light receiver can include a photodiode (PD) for receiving light. The PD converts light into an electrical signal. For example, the light receiver can receive information on a preceding vehicle through light emitted from a light source included in the preceding vehicle.

In addition, the light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency.

According to some embodiments, the light transmitter includes an array of a plurality of light emitting devices. Further, the light transmitter may be integrated with a lamp provided to the vehicle 700. For example, the light transmitter may be a headlight, a taillight, a stop lamp, a turn signal lamp and a sidelight.

In addition, the optical communication module 715 can exchange data with the vehicle 602 through optical communication. Also, the input unit 720 includes a driving manipulation apparatus 721, a microphone 723 and a user input unit 724. In more detail, the driving manipulation apparatus 721 receives user input for driving the vehicle 700 and may include a steering input apparatus, a shift input apparatus, an acceleration input apparatus, and a brake input apparatus.

Further, the steering input apparatus receives a travel direction input of the vehicle 700 from the user. Preferably, the steering input apparatus is formed in the shape of a wheel to allow steering input through rotation. According to some embodiments, the steering input apparatus may include a touchscreen, a touch pad, or a button.

In addition, the shift input apparatus receives, from the user, inputs for Park (P), Drive (D), Neutral (N) and Reverse (R) of the vehicle 700. Preferably, the shift input apparatus is formed in the shape of a lever. According to some embodiments, the shift input apparatus may include a touchscreen, a touch pad, or a button.

The acceleration input apparatus receives an input for accelerating the vehicle 700 from the user, and brake input apparatus receives an input for decelerating the vehicle 700 from the user. Preferably, the acceleration input apparatus and the brake input apparatus are formed in the shape of a pedal. According to some embodiments, the acceleration input apparatus and the brake input apparatus may include a touchscreen, a touch pad, or a button.

In addition, the microphone 723 processes an external sound signal to create electrical data that can be utilized for various purposes according to functions being executed by the vehicle 700. The microphone 723 can also convert a voice command from the user into electrical data to be delivered to the controller 770.

According to an embodiment, the camera 722 or the microphone 723 may be a constituent included in the sensing unit 760 rather than being included in the input unit 720. Further, the user input unit 724 is intended to receive information from the user. When information is input through the user input unit 724, the controller 770 can control operation of the vehicle 700 in accordance with the input information.

The user input unit 724 may also include a touch input mechanism or a mechanical input mechanism. According to some embodiments, the user input unit 724 may be disposed in one area of the steering wheel. In this instance, the driver can manipulate the user input unit 724 with their fingers while holding the steering wheel.

Further, the sensing unit 760 senses a signal related to traveling of the vehicle 700. Thus, the sensing unit 760 may include a collision sensor, a wheel sensor, a speed sensor, a tilt sensor, a weight sensor, a heading sensor, a yaw sensor, a gyro sensor, a position module, a vehicle drive/reverse drive sensor, a battery sensor, a fuel sensor, a tire sensor, a steering sensor based on turning of the steering wheel, a vehicle interior temperature sensor, a vehicle exterior temperature sensor, a vehicle interior humidity sensor, and a rain sensor.

Thereby, the sensing unit 760 can acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle exterior temperature information, vehicle interior humidity information, information about whether it rains, and an angle by which the steering wheel is rotated.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS). The sensing unit 760 may also include a biometric identification information sensing unit that senses and acquires biometric identification information of a passenger.

Further, the biometric identification information may include fingerprint information, iris scan information, retina scan information, hand geometry information, facial recognition information, and voice recognition information. The biometric identification information sensing unit may also include a sensor for sensing biometric identification information of a person in the vehicle. Further, the interior camera and the microphone 723 may operate as sensors. The biometric recognition information sensing unit can also acquire hand shape information and face recognition information through the interior camera.

In addition, the sensing unit 760 may include an object sensor 761 including one of a radar, a lidar, an ultrasonic sensor, a TOF sensor and an infrared sensor. Preferably, the object sensor 761 includes a radar or a lidar. If the object sensor 761 is provided with a radar or a lidar, the object sensor 761 can sense presence of an object, a distance to the object, a relative speed of the object, and the location of the object.

Further, data, a signal or information generated by the object sensor 761 is transmitted to the controller 770, and the object sensor 761 can sense an object located around the vehicle 700 such as a user. The object sensor 761 can also calculate the distance to the object and calculate an approach speed of the object based on the distance information.

In addition, the output unit 740, which serves to output information processed by the controller 770, may include a display unit 741, a sound output unit 742 and a haptic output unit 743. The display unit 741 can display information processed by the controller 770 such as displaying vehicle-related information.

Further, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include one of a liquid crystal display (LCD), a thin film transistor-liquid crystal display (TFT LCD), an organic light-emitting diode (OLED) display, a flexible display, a 3D display and an e-ink display. The display unit 741 may also form a layered architecture together with a touch sensor or be integrated with the touch sensor, thereby implementing a touchscreen.

Such touchscreen can thus function as the user input unit 724 providing an input interface between the vehicle 700 and the user and also as an output interface between the vehicle 700 and the user. In this instance, the display unit 741 may include a touch sensor for sensing touch applied to the display unit 741 in order to receive a control command in a touch manner. Thereby, when the display unit 741 is touched, the touch sensor can sense the touch, and the controller 770 can generate a control command corresponding to the touch. Content input through touch includes characters, numbers, or menu items which can be indicated or specified in various modes.

In addition, the display unit 741 may include a cluster to allow the driver to check the vehicle condition information or vehicle driving information during driving. The cluster may be positioned on the dashboard and the driver can check the information displayed on the cluster while looking forward.

According to some embodiments, the display unit 741 may be implemented as a head up display (HUD). If the display unit 741 is implemented as the HUD, information can be output through a transparent display provided to the windshield. Alternatively, the display unit 741 may be provided with a projection module, thereby outputting information through an image projected onto the windshield.

Further, the sound output unit 742 converts an electrical signal from the controller 770 into an audio signal and outputs the audio signal. Thus, the sound output unit 742 may include a speaker to output sound corresponding to operation of the user input unit 724.

In addition, the haptic output unit 743 generates haptic output such as vibrating the steering wheel, a seat belt and a seat to allow the user to recognize the output. The vehicle drive unit 750 can also control operations of various vehicular devices and receive a control signal from the display apparatus 100 for vehicles. The vehicle drive unit 750 can control various devices based on the control signal.

Further, as shown, the vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759. In addition, the power source drive unit 751 can perform electronic control of the power source in the vehicle 700.

For example, if a fossil fuel-based engine is the power source, the power source drive unit 751 can perform electronic control of the engine. Thereby, the output torque of the engine can be controlled. If the power source drive unit 751 is an engine, the output torque of the engine can be controlled by the controller 770 to limit the speed of the vehicle. As another example, if an electric motor is the power source, the power source drive unit 751 can control the motor. Thereby, the rotational speed and torque of the motor can be controlled.

Further, the power source drive unit 751 can receive an acceleration control signal from the display apparatus 100 and control the power source according to the received acceleration control signal. The steering drive unit 752 can perform electronic control of the steering apparatus in the vehicle 700. Thereby, the steering drive unit 752 can change the travel direction of the vehicle. The steering drive unit 752 can receive a steering control signal from the display apparatus 100. The steering drive unit 752 can control the steering apparatus to be steered according to the steering control signal.

In addition, the brake drive unit 753 can perform electronic control of a brake apparatus in the vehicle 700. For example, by controlling the operation of the brakes disposed on the wheels, the speed of the vehicle 700 can be reduced. In another example, the brake disposed on a left wheel can be operated differently from the brake disposed on a right wheel in order to adjust the travel direction of the vehicle 700 to the left or right. The brake drive unit 753 can also receive a deceleration control signal from the display apparatus 100. Further, the brake drive unit 753 can control the brake apparatus according to the received deceleration control signal.

The lamp drive unit 754 can control lamps disposed inside and outside the vehicle to be turned on/off. In addition, the lamp drive unit 754 can control the intensity and direction of light from the lamps. For example, the lamp drive unit 754 can control a turn signal lamp and a brake lamp.

The air conditioning drive unit 755 can perform electronic control of an air conditioner in the vehicle 700. For example, if the temperature of the interior of the vehicle is high, the air conditioning drive unit 755 can control the air conditioner to supply cool air to the interior of the vehicle.

Further, the window drive unit 756 can perform electronic control of a window apparatus in the vehicle 700. For example, the window drive unit 756 can control opening or closing of the left and right windows on both sides of the vehicle. Also, the airbag drive unit 757 can perform electronic control of an airbag apparatus in the vehicle 700. For example, the airbag drive unit 757 can control the airbag apparatus such that the airbags are inflated when the vehicle is exposed to danger.

The sunroof drive unit 758 can perform electronic control of a sunroof apparatus in the vehicle 700. For example, the sunroof drive unit 758 can control opening or closing of the sunroof. Also, the suspension drive unit 759 can perform electronic control of a suspension apparatus in the vehicle 700.

For example, when a road surface is uneven, the suspension drive unit 759 can control the suspension apparatus to attenuate vibration of the vehicle 700. The suspension drive unit 759 can also receive a suspension control signal from the display apparatus 100 and control the suspension apparatus according to the received suspension control signal.

Further, the memory 730 is electrically connected to the controller 770 and can store basic data for each unit, control data for controlling operation of each unit, and input/output data. When implemented through hardware, the memory 730 may include various storage devices such as a ROM, RAM, EPROM, flash drive, and hard drive. The memory 730 can also store various kinds of data for overall operation of the vehicle 700 including a program for processing or controlling operation of the controller 770.

In addition, the interface unit 780 serves as a path between the vehicle 700 and various kinds of external devices connected thereto. For example, the interface unit 780 may be provided with a port connectable to the mobile terminal 600, thus being connected to the mobile terminal 600 through the port. In this instance, the interface unit 780 can exchange data with the mobile terminal 600.

The interface unit 780 also serves as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

Further, the controller 770 can control overall operations of the respective units in the vehicle 700 and be called an electronic control unit (ECU). The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In addition, the power supply 790 can be controlled by the controller 770 to supply electric power necessary for operation of respective constituents. In particular, the power supply 790 may be supplied with power from, for example, a battery in the vehicle. Also, the camera 200 can acquire a surroundings-of-vehicle image and may include at least one lens and at least one image sensor (e.g., CMOS or CCD), and an image processor.

Further, the camera 200 can detect an object from the surroundings-of-vehicle image. In detecting objects, the camera 200 can perform lane detection (LD), vehicle detection (VD), pedestrian detection (PD), bright-spot detection (BD), traffic sign recognition (TSR), and road surface detection, structure detection, and the like.

The camera 200 can also verify the detected object using a verification technique such as neural network, support vector machine (SVM), AdaBoost using Haar-like features, and histograms of oriented gradients (HOG). In this instance, the camera 200 can perform the verification operation by comparing the detected object in the surroundings-of-vehicle image with data stored in the memory 140.

In addition, the camera 200 can track the verified object, calculate motion of the verified object or motion vectors of the verified object, and track movement of the object based on the calculated motion or motion vectors. The camera 200 can also generate information about the distance to the object based on the surroundings-of-vehicle image and acquire information about the distance between the vehicle 700 and the object based on disparity information.

For example, the camera 200 can generate disparity information based on a stereo image, and acquire the distance information about the object based on the generated disparity information. The stereo image may be an image acquired through a stereo camera. For example, the camera 200 can generate disparity information based on a plurality of mono images, and acquire the distance information about the object based on the generated disparity information. Further, the plurality of mono image may be acquired through one camera at predetermined time intervals, and the mono image may be acquired through a mono camera or an around view camera.

In addition, the camera 200 can generate relative speed information about an object by tracking the object and calculate the relative speed information about the object based on variation of the distance to the object with time with the information about the distance to the object acquired.

The camera 200 may include a mono camera, a stereo camera and an around view camera. In more detail, the mono camera may include one lens, and one image sensor, and acquire mono images, the stereo camera may include two lenses and two image sensors, and acquire stereo images, and the around view camera may include four lenses and four image sensors, and acquire around view images. The around view camera may be a camera employed by an around view monitoring (AVM) system.

Further, the camera 200 can detect a user. For example, the camera 200 can detect the user by detecting feature points of the face of the user. The camera 200 can also calculate the distance to the user. In this instance, the camera 200 can use the aforementioned method of detecting the distance to an object. The camera 200 can also calculate the approach speed of the user based on the distance information.

In addition, the display apparatus 100 can exchange data with the controller 770, and the controller 770 can receive navigation information from the display apparatus 100 or a separate navigation apparatus. Further, the navigation information may include designated destination information, route information according to the destination, map information, or location information about the vehicle, where the map information and location information are related to traveling of the vehicle.

Figure 6:
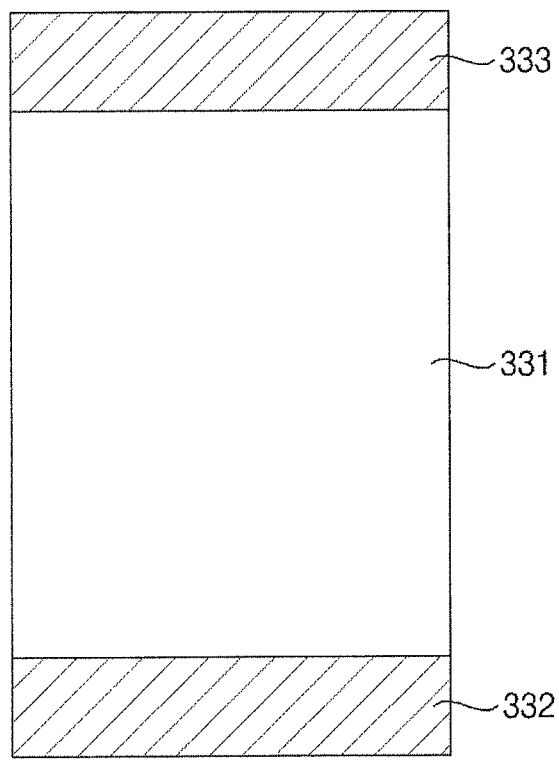
FIG. 6 is a view schematically illustrating a heating element according to an embodiment of the present invention.

Next, FIG. 6 is a view schematically illustrating a heating element 330 according to an embodiment of the present invention. Referring to FIG. 6, the heating element 330 includes bus bars 332 and 333 and a conductive heating mechanism 331 electrically connected to the bus bars 332 and 333.

Further, the conductive heating mechanism 331 refers to a mechanism which is electrically connected to the bus bars 332 and 333 and is capable of producing heat according to the resistance and thermal conductivity thereof when a voltage is applied to the bus bars 332 and 333. A conductive material having the shape of a plane or a line may be used as the heating mechanism 331.

When the heating mechanism 331 has a planar shape, the heating mechanism 331 may be formed of a transparent conductive material such as; for example, ITO and ZnO or of a thin film of an opaque conductive material. When the heating mechanism 331 has a line shape, the heating mechanism 331 may be formed of a transparent or opaque conductive material. According to an embodiment of the present invention, when the heating mechanism 331 has a line shape, the heating mechanism 331 may be configured not to obstruct the view of the user by adjusting the line width and the uniformity of a pattern even if the heating mechanism is formed of an opaque material such as a metal.

Further, the heating mechanism 331 may be referred to as a conductive heating surface if the heating mechanism has a planar shape. Also, if the heating mechanism 331 has a line shape, the heating mechanism 331 may be referred to as a conductive heating line. When heat is produced using a heating element, an increment of temperature is determined by power per unit area. In addition, a conductive heating line may be a straight line or may have other forms such as a curve, a wavy line and a zigzag line.

In addition, the conductive heating line may be formed in a pattern such as stripe, diamond, square lattice, circle, wave, grid and two-dimensional grid. The conductive heating line is not limited to specific shapes, but is preferably designed not to deteriorate the optical properties of light emitted from a certain light source due to diffraction and interference of light. That is, to minimize regularity of a pattern, a pattern provided with irregular spacing and line thickness of a wavy pattern, a sine wave and a lattice structure may be used. The pattern of the conductive heating line may also be a combination of two or more patterns.

Further, the conductive heating line may include an irregular pattern in which the ratio of the standard deviation to the average of distances of adjacent intersection points of the conductive heating line to a straight line intersecting the conductive heating line (distance distribution ratio) is greater than or equal to 2%, for example. The line intersecting the conductive heating line may also be a line providing the smallest standard deviation of distances of the line to adjacent intersection points of the conductive heating line.

Alternatively, the line intersecting the conductive heating line may be a line perpendicular to a tangential line at a point on the conductive heating line. By using such conductive heating line pattern, side effects including moiré according to diffraction and interference of the light source may be prevented. Further, the straight line intersecting the conductive heating line may have at least 80 intersection points. Also, the ratio of the standard deviation to the average of distances of adjacent intersection points of the conductive heating line to the straight line intersecting the conductive heating line (distance distribution ratio) may be greater than or equal to 2%, 10% or 20%. At least one portion of the surface of a transparent substrate provided with the heating line pattern described above may have another conductive heating line pattern.

According to an embodiment of the present invention, the irregular pattern may include closed geometric figures exhibiting continuous distribution, and include a pattern having a ratio of the standard deviation to the average of the areas of the closed geometric figures (area distribution ratio) greater than or equal to 2%. By using such conductive heating line pattern, side effects including moiré according to diffraction and interference of the light source can be prevented.

Further, the number of the closed geometric figures may be greater than or equal to 100. Also, the ratio of the standard deviation to the average of the areas of the closed geometric figures (area distribution ratio) may be greater than or equal to 2%, 10% or 20%. At least one portion of the surface of a transparent substrate provided with the aforementioned heating line pattern with a ratio of the standard deviation to the average of the areas of the closed geometric figures (area distribution ratio) is greater than or equal to 2% may have another conductive heating line pattern.

In addition, if the patterns are fully irregular, the distribution of the line may have coarse parts and dense parts. Such line distribution may be noticed however small the line width may be. To address this issue of visible recognizability, the present invention can properly harmonize regularity and irregularity in forming a heating line. Further, a basic unit may be defined so as not to make the heating line noticeable or to cause local heating, and the heating line may be formed in a an irregular pattern within the basic unit. With this method, the line can be distributed not to be concentrated at one point, and thus the issue related to visibility can be addressed.

According to another embodiment of the present invention, the irregular pattern can include a conductive heating line pattern having the shape of a boundary line of geometric figures that forms a Voronoi diagram. Further, the irregular pattern may include a conductive heating line pattern having the shape of a boundary line of geometric figures including at least one triangle that forms a Delaunay pattern.

In addition, to provide uniform heating and visibility of the heating element, the aperture ratio of the conductive heating line pattern per unit area may be set to be constant. The heating element may also have deviation of transmission factor less than or equal to 5% with respect to any circle having a diameter of 20 cm. In this instance, the heating element can prevent local heating. In addition, after the heating element produces heat, the standard deviation of temperatures on the surface of the transparent substrate may be within 20%. For a specific purpose, however, the conductive heating line may be disposed such that the heating element has a temperature deviation.

In this embodiment, the heating element 330 can be arranged on a transparent substrate. Further, the transparent substrate is not specifically limited, but may have light transmittance greater than or equal to 50% or 75%. For example, glass, a plastic substrate or a plastic film may be used as the transparent substrate.

When a plastic film is used as the transparent substrate, glass may be bonded to at least one surface of the substrate after a conductive heating line pattern is formed. In this instance, glass or a plastic substrate may be bonded to a surface of the transparent substrate on which the conductive heating line pattern has been formed. The plastic substrate or film may be formed of a material well known in the art. For example, the film may be formed of a material having visible light transmittance greater than or equal to 80% such as PET (Polyethylene terephthalate), PVB (polyvinylbutyral), PEN (polyethylene naphthalate), PES (polyethersulfon), PC (polycarbonate) and acetyl celluloid. The thickness of the plastic film may be between 12.5 μm and 500 μm or between 50 μm and 250 μm.

In the present invention, the material of the conductive heating line may be metal having high thermal conductivity. In addition, resistivity of the material of the conductive heating line may be between 1 microOhm cm and 200 microOhm cm. Examples of materials of the conductive heating line may include copper, silver and carbon nanotube. Silver may be the most preferable material.

The material of the conductive heating line may be used in the form of particles such as copper particles coated with silver. The heating element 330 may be connected to a power source to produce heat. The amount of produced heat of the heating element 330 may be determined by control of the processor 170.

Figure 7:
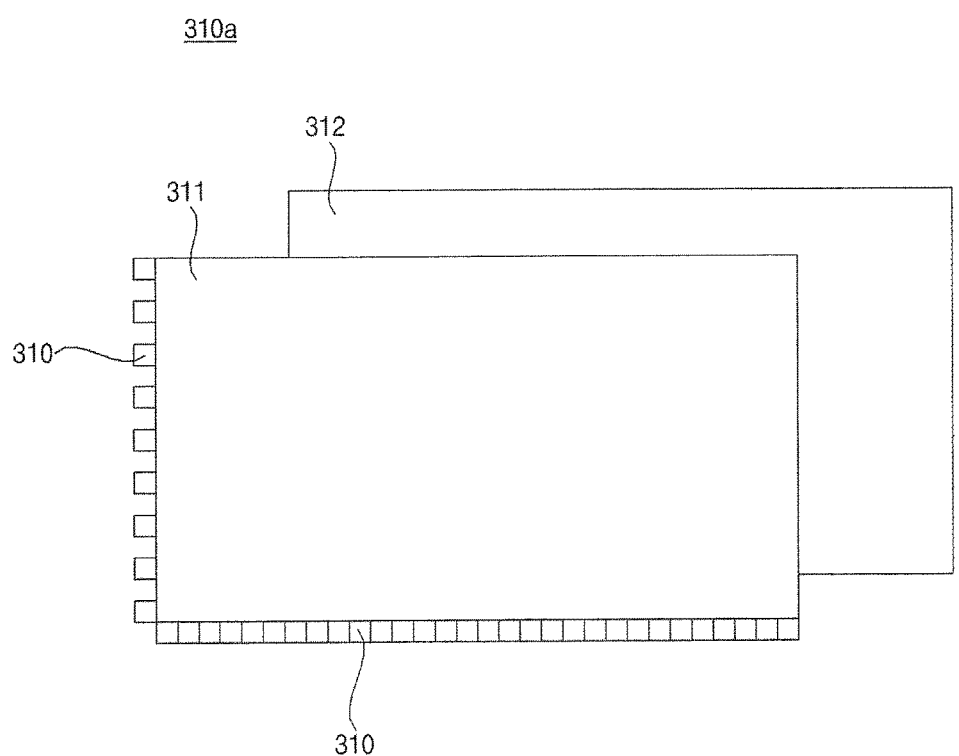
FIG. 7 is an view illustrating a display according to an embodiment of the present invention.

FIG. 7 is an exemplary view illustrating a display according to an embodiment of the present invention. Hereinafter, description will be given of an embodiment of the display 151 including a liquid crystal display panel 310a with reference to FIG. 7. It should be noted that other types of display panels may also be covered by the present invention.

Referring to FIG. 7, the liquid crystal display panel 310a includes a liquid crystal panel 311 and a backlight unit 312. For example, the liquid crystal panel 311 includes a first substrate, a second substrate, a liquid crystal layer sealed between the first substrate and the second substrate, the first substrate and the second substrate being spaced from each other.

The liquid crystal panel 311 further includes a first polarizing plate disposed on the outer side of the first substrate, a second polarizing plate disposed on the outer side of the second substrate, a first electrode disposed between the first substrate and the liquid crystal layer, a second electrode disposed between the second substrate and the liquid crystal layer, and a color panel disposed between the second substrate and the second electrode. The liquid crystal panel 311 further includes a first alignment film disposed between the first electrode and the liquid crystal layer and a second alignment film disposed between the second electrode and the liquid crystal layer.

The first substrate and the second substrate of the liquid crystal panel 311 are formed of glass or a plastic material and flexible. The liquid crystal panel 311 displays images by creating light and shade by changing the array of liquid crystal particles according to an external electric field with the liquid crystal with a property between solid and liquid that is injected into a space between two thin substrates.

Since the liquid crystal panel 311 is non-self-luminescent element (light receiving element), the liquid crystal panel 311 is not usable unless a separate light emitting method is provided. For this reason, the liquid crystal panel 311 uses the backlight unit 312 implemented in the form of a surface light source capable of maintaining uniform brightness over the entire screen thereof.

In particular, the backlight unit 312 is a device for emitting light toward the liquid crystal panel 311 using light sources (LEDs). Types of the backlight unit 312 include a direct type having a plurality of light sources arranged on the lower surface of the liquid crystal panel to emit light and an edge type having a light guide plate installed on the lower surface of the liquid crystal panel and a plurality of light sources arranged on at least one side of the light guide plate.

The liquid crystal display panel 310a adjusts the amount of the transmitted portion of the light emitted from the backlight unit 312 to make an image shown through the liquid crystal panel 311. Further, the amount of light transmitted through the liquid crystal layer is adjustable according to the magnitude of the applied voltage.

In addition, the liquid crystal display panels 310a are classified into Passive Matrix (PM)-type panels and Active Matrix (AM)-type panels according to activation techniques for the panel. For the PM-type liquid crystal display panel, a voltage is applied to electrodes of a horizontal axis and a vertical axis to activate a liquid crystal at the point of intersection between the horizontal axis and the vertical axis. For the AM-type liquid crystal display panel, each pixel of the panel is controlled by a thin film transistor (TFT).

The case of the PM-type liquid crystal display panel displays desired images according to the following principle. When a voltage is applied to a first electrode and a second electrode, an electric field is created between the two electrodes. The electric field in turn changes the angle of arrangement of the liquid crystals, and the light transmittance changes according to the angle of arrangement.

The AM-type liquid crystal display panel further includes a TFT panel. The TFT panel is disposed spaced from the color panel and includes a plurality of gate lines, data lines and pixel electrodes. A light emitting element 310 may be disposed on the upper side or outer side of the liquid crystal display panel 310a.

The light emitting element 310 may be disposed on the lower side or inner side of the liquid crystal display panel 310a. For example, the light emitting element 310 may be disposed between the liquid crystal display panel 311 and the backlight unit 312. As discussed above, the heating element 310 can provide heat to the display 151. For example, the heating element 310 can provide heat to the liquid crystal display panel 310a.

Figure 8:
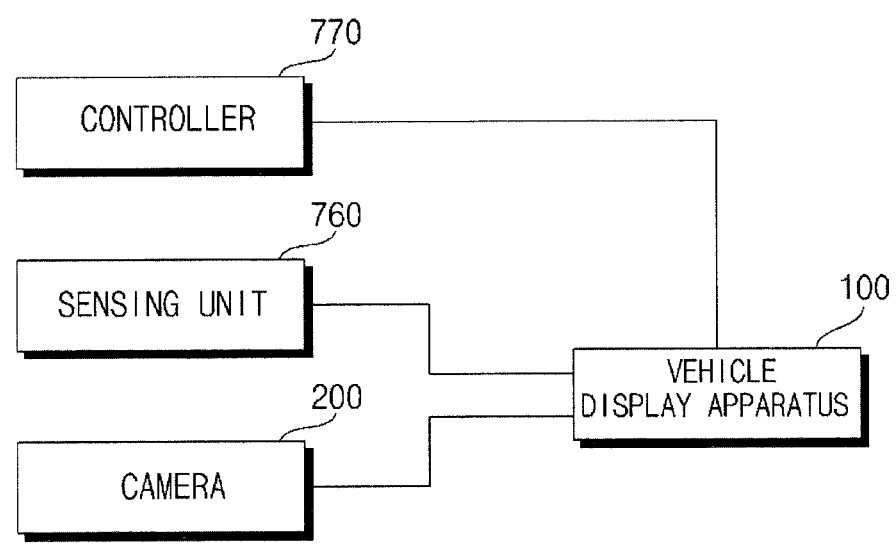
FIG. 8 is a diagram illustrating an operation of acquiring event information according to an embodiment of the present invention.

Next, FIG. 8 is a diagram illustrating an operation of acquiring event information according to an embodiment of the present invention. Referring to FIG. 8, the processor 170 can receive event information from the controller 770, the sensing unit 760 or the camera 200 through the interface unit 130. For example, the processor 170 can receive remote engine start event information from the controller 770.

When the vehicle 700 receives a remote engine start signal from a smart key carried by the user, the controller 770 of the vehicle 700 can start the engine of the vehicle 700. In this instance, the processor 170 can transmit remote engine start event information to the display apparatus 100. The processor 170 can receive remote engine start event information from the controller 770 through the interface unit 130.

For example, the processor 170 can receive user approach event information from the sensing unit 760 or the camera 200. The object sensor 761 of the sensing unit 760 can sense approach of the user. In addition, the object sensor 761 can calculate the distance to the user and the approach speed of the user. Further, the camera 200 can sense approach of the user.

In addition, the camera 200 can calculate the distance to the user and the approach speed of the user. The processor 170 can receive user approach event information from the object sensor 761 or the camera 200 through the interface unit 130. For example, the processor 170 can receive door opening event information. When a door of the vehicle is opened by the user, the controller 770 can provide door opening event information to the display apparatus 100. The processor 170 can also receive door opening event information through the interface unit 130.

Further, the processor 170 can acquire event information and remote engine start event information through the communication unit 110. In addition, the smart key communication module 117 can perform communication with a smart key carried by the user, and the processor 170 can receive remote engine start event information through the smart key communication module 117.

The processor 170 can acquire user approach event information through the communication unit 110 and acquire the user approach event information through the smart key communication module 117. In performing communication with the smart key carried by the user, the smart key communication module 117 can sense the distance between the vehicle 700 and the user based on Received Signal Strength Indication (RSSI):

When the user approaches the vehicle 700, and thus the distance between the vehicle 700 and the user becomes less than or equal to a predetermined distance, the processor 170 can determine that the user is approaching the vehicle 700. In this instance, the processor 170 can acquire user approach event information and acquire the approach speed of the user by calculating the distance to the user per unit time.

Further, the processor 170 can acquire the user approach event information by performing communication with the mobile terminal 600 carried by the user through the communication unit 110. The processor 170 can also perform communication with the mobile terminal 600 through the mobile communication module 112 or the short-range communication module 113. In this instance, the processor 170 can receive location information about the mobile terminal 600.

In addition, the processor 170 can acquire the information about the distance between the vehicle 700 and the user based on the location information about mobile terminal 600. When the user approaches the vehicle 700, and thus the distance between the vehicle 700 and the user becomes less than or equal to a predetermined distance, the processor 170 can determine that the user is approaching the vehicle 700. In this instance, the processor 170 can acquire user approach event information and acquire the approach speed of the user by calculating the distance to the user per unit time.

Figure 9:
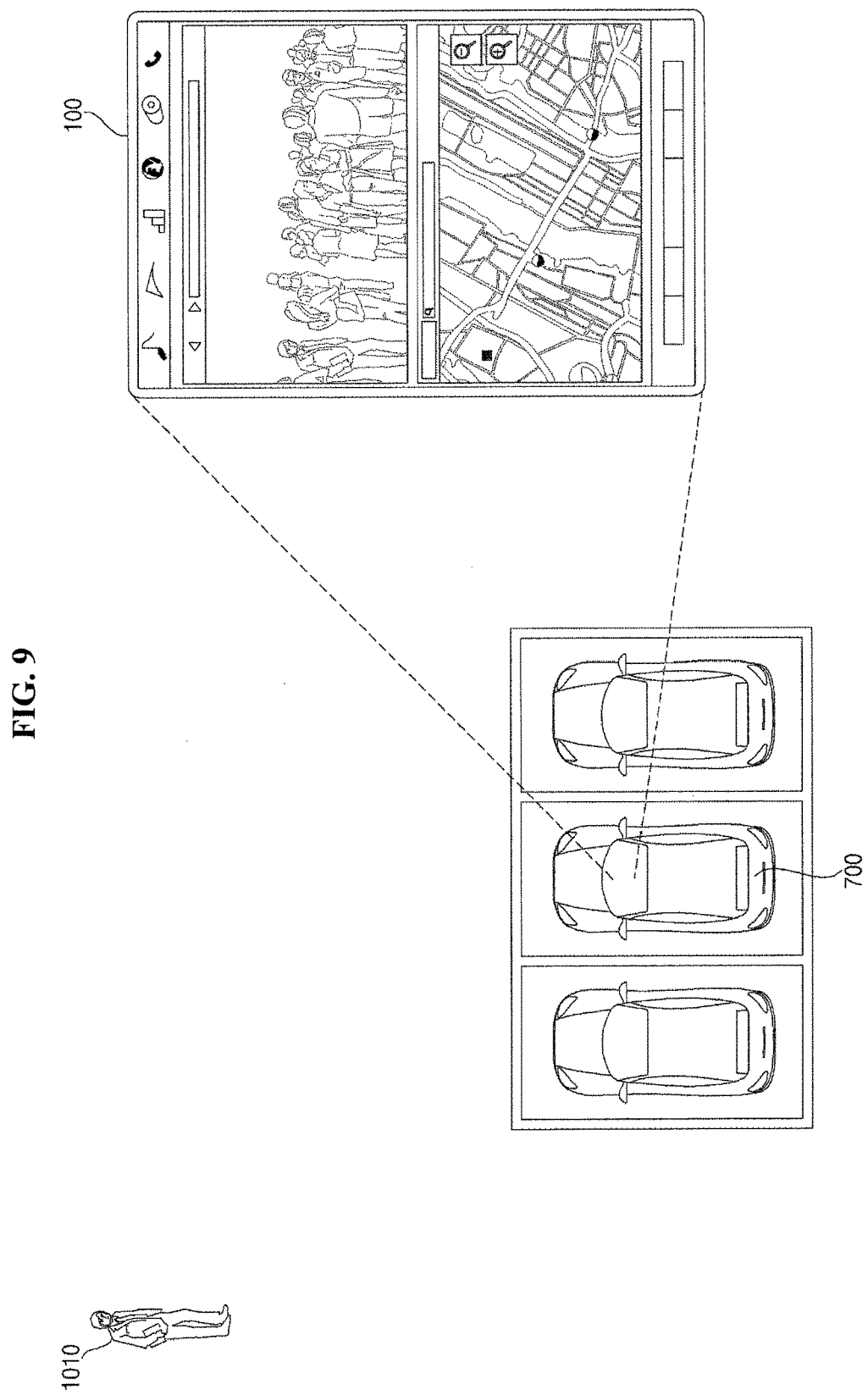
FIG. 9 is a view illustrating an operation of a display apparatus for vehicles performed based on remote engine start event information according to an embodiment of the present invention.

Next, FIG. 9 is a view illustrating an operation of a display apparatus for vehicles performed based on remote engine start event information according to an embodiment of the present invention. Referring to FIG. 9, the vehicle 700 can receive a remote engine start signal from a smart key carried by the user 1010.

Upon receiving the remote engine start signal, the controller 770 can start the engine of the vehicle 700. At this time, the controller 770 can provide remote engine start event information to the display apparatus 100. The processor 170 can receive the remote engine start event information through the interface unit 130. In addition, the processor 170 can directly receive the remote engine start signal through the communication unit 110. In this instance, the processor 170 can acquire the remote engine start event information.

Upon acquiring the remote engine start event information, the processor 170 can control the heating element 160 to produce heat based on the remote engine start event information. As the heating element 160 is controlled to produce heat according to the remote engine start event information as described above, heat can be provided to the display 151 before the user enters the vehicle 700. Thereby, the display 151 can normally operate even in a cold environment when the user 1010 enters the vehicle 700.

Figure 10:
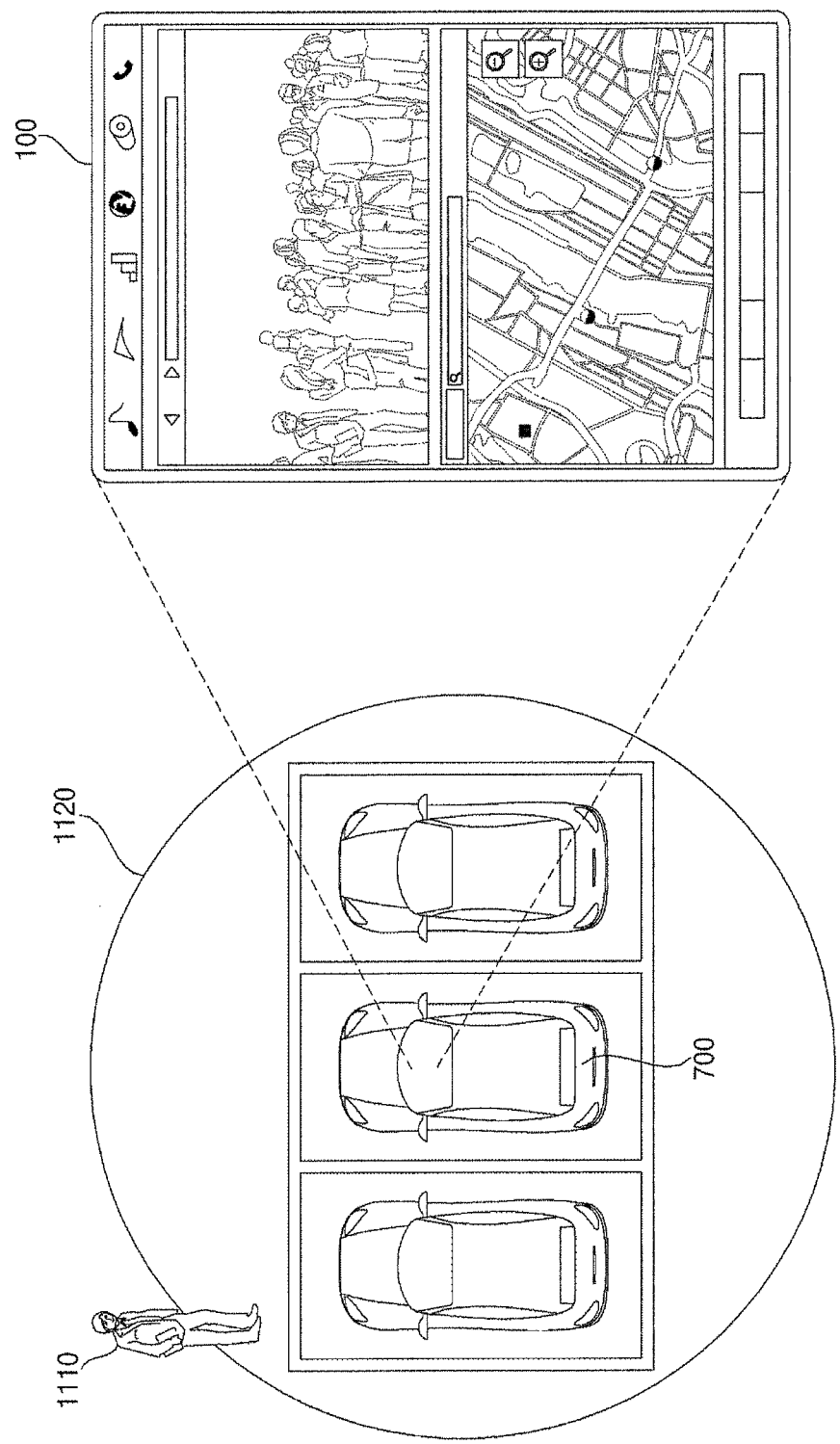
FIG. 10 illustrates operation of a display apparatus for vehicles based on user approach event information according to an embodiment of the present invention.

Next, FIG. 10 illustrates operation of a display apparatus for vehicles based on user approach event information according to an embodiment of the present invention. Referring to FIG. 10, the processor 170 can acquire event information about approach of a user 1110.

In addition, the object sensor 761 can sense an object positioned near the vehicle 700. Further, the object may be the user 1110. The object sensor 761 can calculate the distance to the user 1110 and calculate the approach speed of the user 1110 based on the distance information.

The camera 200 can detect the user 1110 and calculate the distance to the user 1110. The camera 200 can also calculate the approach speed of the user 1110 based on the distance information. Further, the processor 170 can receive the information about the distance to the user 1110 from the object sensor 761 or the camera 200 through the interface unit 130. When the distance to the user is within a predetermined distance range 1120, the processor 170 can determine that the user approaches. In this instance, the processor 170 can acquire approach event information about the user 1110.

Further, the processor 170 can acquire the user approach event information through the communication unit 110. Upon acquiring user approach event information, the processor 170 can control the heating element 160 to produce heat based on the user approach event information.

As the heating element 160 is controlled to produce heat according to the user approach event information as described above, heat can be provided to the display 151 before the user enter the vehicle 700. Thereby, the display 151 can normally operate even in a cold environment when the user 1010 enters the vehicle 700.

In addition, the processor 170 can control the degree of heating of the heating element 160 according to the approach speed of the user. Further, the degree of heating includes a heating rate or the amount of produced heat. For example, the processor 170 can control the heating rate or the amount of produced heat of the heating element 160 to increase in proportion to the approach speed of the user. By controlling the degree of heating of the heating element according to the approach speed of the user 1110, the display can normally operate even when the user 1110 rapidly approaches the vehicle.

Figure 11:
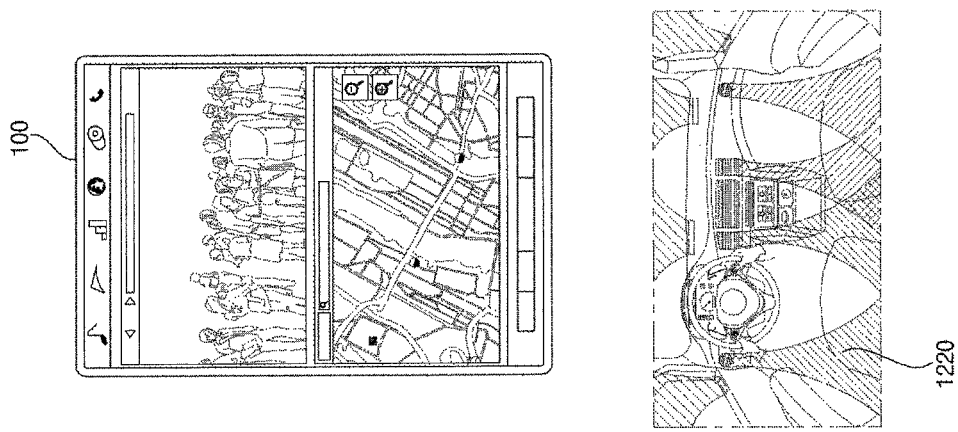
FIG. 11 illustrates operation of a display apparatus for vehicles based on door opening event information according to an embodiment of the present invention.
Figure 11:
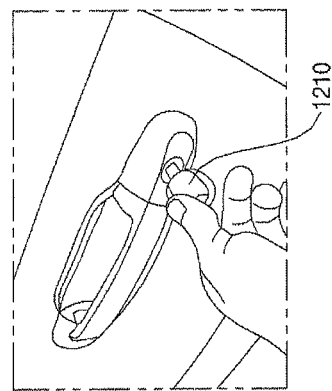

Next, FIG. 11 illustrates operation of a display apparatus for vehicles based on door opening event information according to an embodiment of the present invention. Referring to FIG. 11, the processor 170 can receive door opening event information about the vehicle 700.

When the user attempts to open a door of the vehicle, the controller 770 opens the door. At this time, the controller 770 can provide door opening event information to the display apparatus 100. The processor 170 can also receive the door opening event information through the interface unit 130.

Upon receiving the door opening event information, the processor 170 can control the heating element 160 to produce heat based on the door opening event information. For example, upon receiving the door opening event, the processor 170 can control the heating element 160 to produce maximum heat. That is, when the door opening event is received, the processor 170 can control the heating element 160 to produce heat at a maximum rate such as a maximum heating rate.

Upon receiving the door opening event information, the processor 170 can provide an air conditioner included in the vehicle 700 with a control signal for supplying warm air 1220 to the display 151. In addition, the processor 170 can provide the control signal to the air conditioning drive unit 755 of the vehicle 700, and the air conditioning drive unit 755 of the vehicle 700 can control the air conditioner to supply warm air to the display 151. In this instance, it is preferable to provide warm air with a maximum power at a maximum temperature.

By controlling the heating element 160 to produce maximum heat according to the event of the user opening the door and controlling warm air to be provided to the display 151 as described above, the temperature of the display 151 can be increased to a temperature allowing normal operation of the display 151 in a short time.

Figure 12:
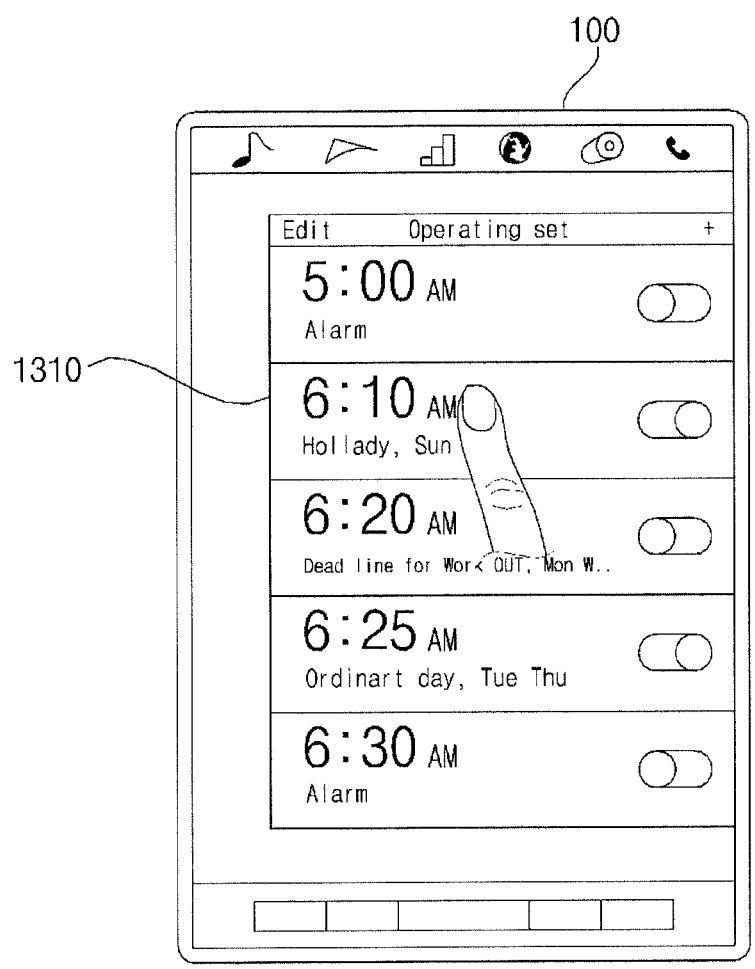
FIG. 12 illustrates operation of a display apparatus for vehicles based on a reservation time input according to an embodiment of the present invention.

Next, FIG. 12 illustrates operation of a display apparatus for vehicles based on a reservation time input according to an embodiment of the present invention. Referring to FIG. 12, the display 151 can form a layered structure together with a touch sensor or be integrated with the touch sensor, thereby implementing a touchscreen. If the display 151 is implemented as a touchscreen, the display 151 can receive touch input.

Further, the processor 170 can generate a control command according to the touch input received through the display 151 and receive input of a reservation time 1310 through at least one touch input provided through the display 151. For example, when a heating reservation mode is set, the processor 170 can receive touch input on a input screen image displayed on the screen. Further, the input screen image may include a virtual keyboard image and an analog or digital clock image. Upon receiving a reservation time input, the processor 170 can control the heating element 160 to produce heat at the reservation time.

Figure 13:
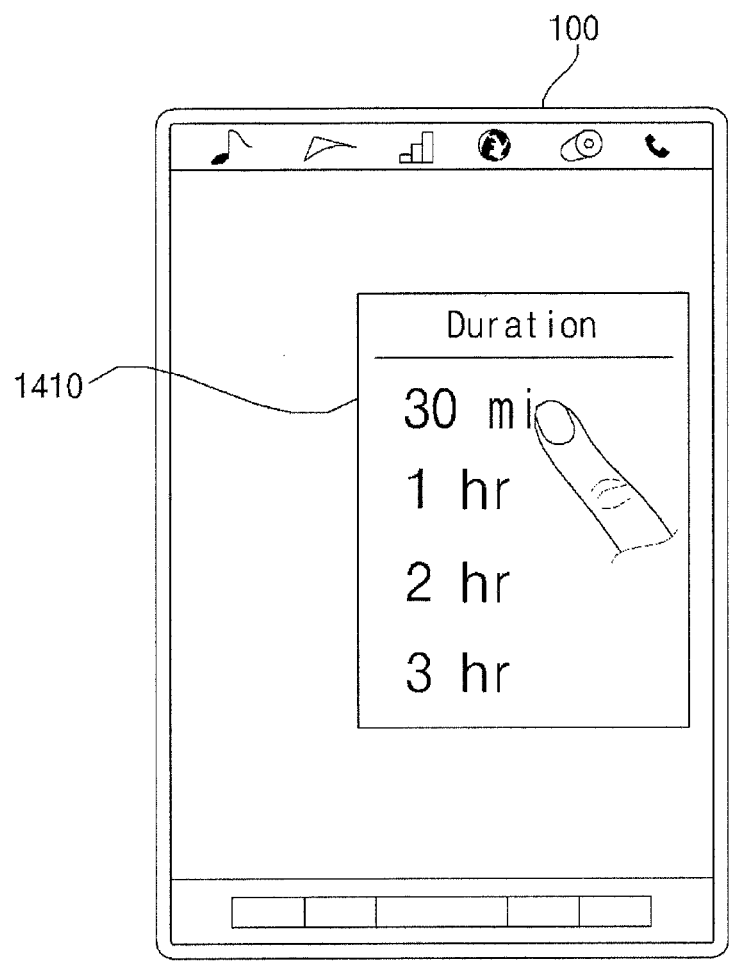
FIG. 13 illustrates operation of a display apparatus for vehicles based on a duration input according to an embodiment of the present invention.

Next, FIG. 13 illustrates operation of a display apparatus for vehicles based on a duration input according to an embodiment of the present invention. Referring to FIG. 13, the processor 170 can receive a heating duration input through at least one touch input provided to the display 151.

For example, when a heating reservation mode is set, the processor 170 can receive touch input on a input screen image displayed on the screen. Further, the input screen image may include a virtual keyboard image, an analog or digital clock imager, and a plurality of predetermined time images.

When the heating element 160 produces heat at a reservation time, the processor 170 can control the heating element 160 to produce heat for a heating duration. Once the heating element 160 produces heat at the reservation time, and the heating duration ends, the processor 170 can control the heating element 160 to stop producing heat.

Figure 14:
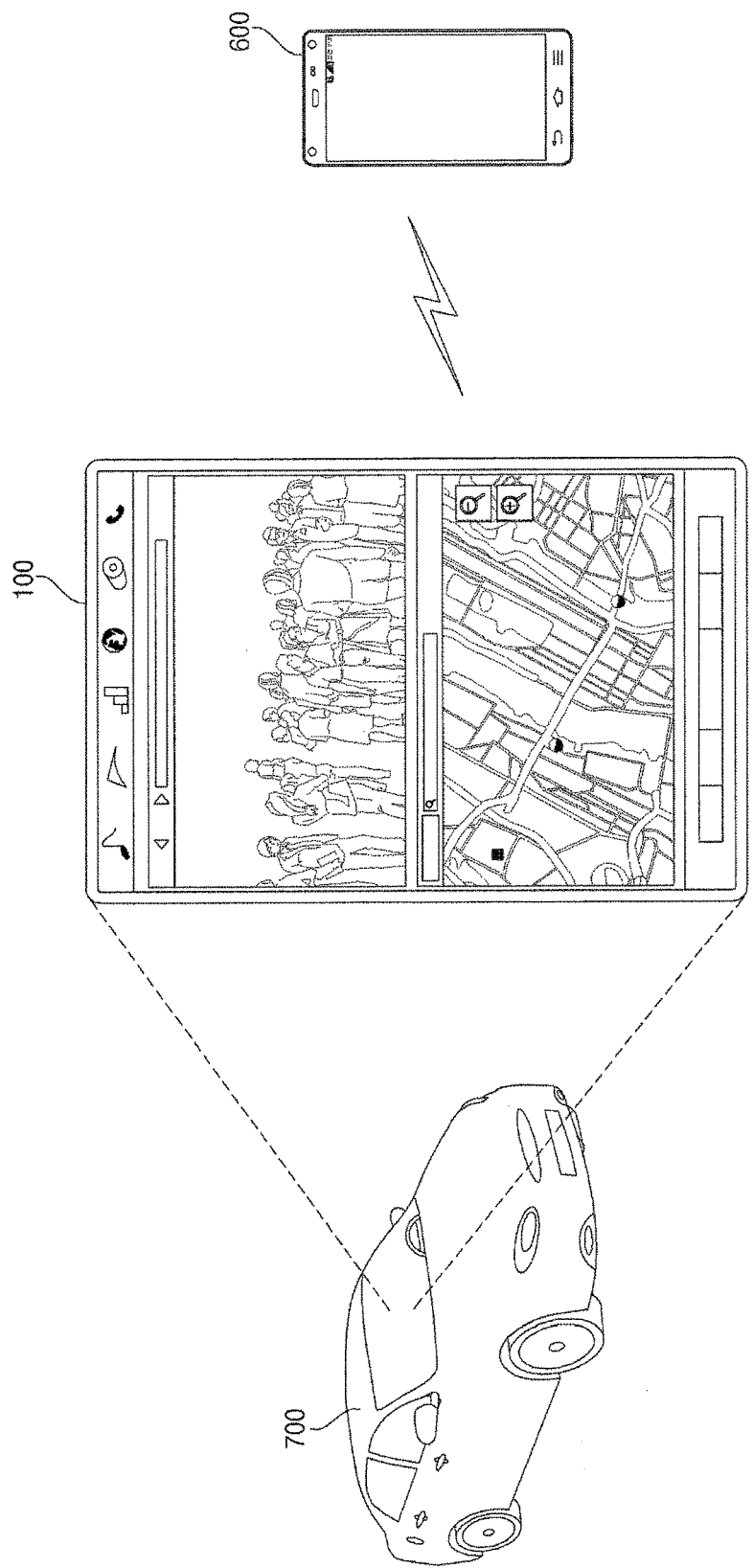
FIG. 14 illustrates communication with a mobile terminal according to an embodiment of the present invention.

Next, FIG. 14 illustrates communication with a mobile terminal according to an embodiment of the present invention. Referring to FIG. 14, the display apparatus 100 can perform communication with the mobile terminal 600 carried by the user through the communication unit 110. For example, the display apparatus 100 can perform communication with the mobile terminal 600 through the mobile communication module 112 or the short-range communication module 113.

In addition, the processor 170 can transmit the interior temperature information or exterior temperature information about the vehicle 700 to the mobile terminal 600 through the communication unit 110. In this instance, the mobile terminal 600 can display the received interior temperature information or exterior temperature information about the vehicle 700.

Further, the mobile terminal 600 can receive a user input for controlling the display apparatus 100. For example, the mobile terminal 600 can receive a user input for controlling the heating operation of the heating element 160. The mobile terminal 600 transmits, to the display apparatus 100, a control signal for controlling the heating operation of the heating element 160 according to the user input.

The processor 170 can also receive, through the communication unit 110, the control signal for controlling the heating element 160 to produce heat and can provide information about the state of the display apparatus 100 to the mobile terminal 600 through the communication unit 110.

For example, the processor 170 can provide the mobile terminal 600 with information about whether or not heat is produced by the heating element 160, the degree of heating and the heating state through the communication unit 110. In this instance, the user can check, through the mobile terminal 600, whether or not heat is produced by the heating element 160, the degree of heating and the heating state.

As is apparent from the above description, the present invention has one or more of the following advantageous. First, even if a user enters a vehicle parked in an outdoor environment in the winter, the display for vehicles does not malfunction, and the response speed is not degraded. Second, as the display apparatus for vehicles is capable of immediately operating in the winter, the engine does not need to idle to operate the display apparatus.

Third, as separate idling is not needed, the fuel efficiency is enhanced. Fourth, the display can be properly warmed in a situation encountered by the user by controlling a heating element according to various events. Fifth, malfunction of the display apparatus for vehicles can be prevented. Thereby, accidents can be prevented.

The present invention described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, the invention may be implemented in the form of a carrier wave (e.g., transmission over the Internet). In addition, the computer may include the processor 170 or the controller 770. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display apparatus in a vehicle, the display apparatus comprising:
a display;
a heating element configured to provide heat to the display;
an interface configured to receive at least one of interior temperature information and exterior temperature information about the vehicle; and
a processor configured to:
control the heating element to produce heat based on the received at least one of the interior temperature information and the exterior temperature information about the vehicle,
receive event information including user approach event information via the interface,
control the heating element to produce heat based on the received event information,
control a degree of heating of the heating element according to a user approach speed included in the received user approach event information,
control the heating element to produce maximum heat and to control an air conditioner included in the vehicle to supply warm air to the display in response to receiving door opening event information, and
when the heating element fails, control the air conditioner included in the vehicle to supply warm air to the display.

2. The display apparatus according to claim 1, wherein the processor is further configured to receive remote engine start event information via the interface.

3. The display apparatus according to claim 2, wherein the processor is further configured to control the heating element to produce heat according to the received remote engine start event information.

4. The display apparatus according to claim 1, wherein the processor is further configured to provide the interior temperature information or the exterior temperature information to an external device through a wireless communication unit.

5. The display apparatus according to claim 4, wherein the processor is further configured to receive, through the wireless communication unit, a control signal for controlling the heating element to produce heat from the external device.

6. The display apparatus according to claim 4, wherein the processor is further configured to provide the external device with information about whether or not the heating element produces heat through the wireless communication unit.

7. The display apparatus according to claim 1, wherein the processor is further configured to:
 receive a reservation time input via a touch input through the display, and
 control the heating element to produce heat at the reservation time.

8. The display apparatus according to claim 7, wherein the processor is further configured to:
 receive a heating duration input via a touch input through the display, and
 control the heating element to stop producing heat after the heating duration.

9. The display apparatus according to claim 7, wherein the processor is further configured to control the heating element to stop producing heat, when an engine of the vehicle is not started after a predetermined time passes.

10. The display apparatus according to claim 1, further comprising:
 a temperature sensor configured to sense a temperature of surroundings of the display,
 wherein the processor is further configured to control the heating element to maintain the temperature of the surroundings of the display within a predetermined range.

11. The display apparatus according to claim 10, wherein the processor is further configured to control the heating element to stop producing heat, when the temperature of the surroundings of the display reaches a predetermined temperature value.

12. The display apparatus according to claim 1, wherein the processor is further configured to control a degree of heating of the heating element in proportion to an absolute value of an interior temperature or an exterior temperature included in the interior temperature information or the exterior temperature information, respectively, when the interior temperature or the exterior temperature is below 0° C.

13. The display apparatus according to claim 1, wherein the processor is further configured to control a degree of heating of the heating element based on received location information.

14. The display apparatus according to claim 1, wherein, when the heating element is uncontrollable, the processor is further configured to control the air conditioner included in the vehicle to supply warm air to the display.

* * * * *